United States Patent [19]

Peay

[11] Patent Number: 5,799,601
[45] Date of Patent: Sep. 1, 1998

[54] CAMBER INDUCER FOR WING-SAIL

[76] Inventor: Michael B. Peay, 650 N. 80 West, No. 4, Logan, Utah 84321

[21] Appl. No.: 667,860

[22] Filed: Jun. 21, 1996

[51] Int. Cl.$^6$ ............................................. B63H 9/08
[52] U.S. Cl. ................................. 114/98; 114/102
[58] Field of Search ........................ 114/97–99, 102, 114/103, 204, 108, 39.2

[56] References Cited

U.S. PATENT DOCUMENTS

| | | | |
|---|---|---|---|
| 4,064,821 | 12/1977 | Roberts, Jr. et al. | 114/103 |
| 4,073,254 | 2/1978 | Marker | 114/39.2 |
| 4,624,203 | 11/1986 | Ferguson | 114/39 |
| 4,625,671 | 12/1986 | Nishimura | 114/103 |
| 4,649,848 | 3/1987 | Belvedere | 114/103 |
| 4,686,921 | 8/1987 | Magnan | 114/102 |
| 4,699,073 | 10/1987 | Farneli | 114/102 |
| 4,703,707 | 11/1987 | Anderson | 114/102 |
| 4,757,779 | 7/1988 | Graveline | 114/103 |
| 4,823,720 | 4/1989 | Foster | 114/98 |
| 4,856,447 | 8/1989 | Magnan | 114/103 |
| 4,856,448 | 8/1989 | Peyman | 114/103 |
| 4,895,091 | 1/1990 | Elmali et al. | 114/103 |
| 5,035,194 | 7/1991 | Dougherty | 114/102 |
| 5,048,440 | 9/1991 | Spanier | 114/102 |
| 5,189,976 | 3/1993 | Cochran et al. | 114/102 |
| 5,249,542 | 10/1993 | Latham | 114/103 |
| 5,352,311 | 10/1994 | Quigley | 114/103 |

FOREIGN PATENT DOCUMENTS

| | | | |
|---|---|---|---|
| 26 03 256 A | 8/1977 | Germany | 114/98 |
| 3544543 | 6/1987 | Germany | 114/97 |

*Primary Examiner*—Sherman Basinger

[57] ABSTRACT

A camber inducer for use with a double surfaced wing sail on various sail-driven craft such as sailboats, sailboards, ice boats, land sailors, hang gliders and the like. The camber inducer, in cooperation with battens and the first and second surfaces of a double surfaced sail, provides an efficient and easy to use airfoil sail.

11 Claims, 25 Drawing Sheets

Windsurf Inducer

Windsurf Sail Rig

Windsurf Sail Rig
top view

Batten Construction

Batten Section

Batten Section

Batten Section

Batten Section

Sliding Hook Window

Sliding Hook

Windsurf Inducer
with tabs

Windsurf Mast Rotator

Windsurf Mast Rotator #2

Windsurf Sail Rig
top view

Windsurf Sail Rig
top view #2

Tabs with Small Mast

Tabs with Large Mast

Alternate Tab Arrangement

Single "T" Track

Windsurf Inducer
with clamp

Jib Camber Inducer

Sailboat Jib Inducer
top view

Jib with Inducer

Main Sail Assembly
with inducer

Sailboat Main Sail Inducer

Sailboat Mainsail Inducer
top view

Equalizing Block

Inducer with Traveler Car

Inducer with Slug Slide

Alternate Inducer Body

Sail Shapes

Sail Shapes

Sail Shapes

Sail Shapes
non-rotatable mast

Sail Shapes
non-rotatable mast

Sail Shapes
non-rotatable mast

CAMBER INDUCER FOR WING-SAIL

BACKGROUND

1. The Field of the Invention

This invention relates to camber inducers for flexible airfoils, specifically an improved camber inducer for a double surfaced flexible wing used to propel craft such as sailboats, sailboards, ice boats, land sailors, hang gliders and the like.

2. The Background Art

The devices found in the art generally falls into two areas: Camber inducers (found mostly in board sailing or windsurf art); and, Wing sails which are more often applied to sailboat art. In both windsurf art and sailboat art there is a continual striving to create a more efficient sail shape. These two areas are discussed separately below.

BACKGROUND—CAMBER INDUCER DESCRIPTION

A camber inducer is a device that helps the battens of a sail to achieve and maintain the desired camber or curve for the desired airfoil shape in a sail. Common features of a camber inducer are a batten receptacle to hold the forward end of a batten, and a means to connect the inducer to a mast or the sail or both. The connection to the mast or sail often includes means to resist forward movement of the associated batten. The means to resist forward movement includes connection to the sail, resting against the mast, or both.

In boardsailing applications, commonly known as windsurf applications, the camber inducer is a coupling that fits between the forward end of a batten and the mast. Full length battens are held in the sail with batten pockets sewn into the sail. Forward pressure is applied to each batten with a batten tensioner, usually located on the trailing edge or leach of the sail. This forward pressure, along with the cut or shape of the sail, causes the inducer and forward end of the batten to flop to one side of the mast. The compressive tension on the batten, along with the construction of the batten, cause it to bow and form the desired camber in the sail.

Sailboats with fully battened main sails use a similar bowing of their battens to induce the desired camber into the sail. These sails have typical batten pockets sewn into the sail to hold the battens in place. At the rear or leach of each pocket is a batten tensioner to put forward pressure on the batten. At the forward end of each batten pocket (the luff) is a batten pocket terminator or pocket "protector." The pocket protector is designed to hold the forward end of the batten, and resist forward movement of the batten. The pocket protector keeps the batten from tearing through the forward end of the batten pocket. The compressive tension on the batten, then, causes the batten to bow, thus inducing a camber into the sail. The pocket protector also stops the batten from tearing through the end of the batten pocket and hitting the mast. The pocket protector, then, performs many of the same functions as the typical camber inducer used in windsurf sails.

DISCUSSION OF BACKGROUND ART—WINDSURF INDUCERS

Camber inducers used in prior windsurf art have a single receptacle to hold a single batten. They also have a means to attach the inducer to the mast or to the sail or to both. Most prior art inducers allow the forward end of the batten to have limited movement from side to side. The major purpose of these inducers is to help the batten to form the correct bend for the desired camber. A second purpose of these inducers is to produce a smooth sail surface in the forward or luff portion of the sail, specifically to the mast sleeve.

Camber inducers are typically located in a vertical pocket or mast sock at the luff of the sail where the mast is located. Prior art inducers are mostly concerned with creating a smooth, aerodynamic sail surface in this area. One example of prior inducer art claims to make a double surfaced wing, and its disadvantages are discussed below. None of the prior inducers create a useable wing shape and the performance advantage associated with a wing. Each suffers from significant limitations as will be discussed below.

U.S. Pat. No. 5,035,194

U.S. Pat. No. 5,035,194 to Dougherty Jul. 30, 1991 describes alleged improvements over prior camber inducers. The largest structural difference is the inclusion of a spring on the batten receptacle to maintain batten tension in strong wind conditions. The improvements are designed to maintain a more stable draft and not deform in strong winds. A second claimed improvement is to avoid derotation of the forward sail portion. The disadvantage of this device is that it creates a camber in only a single batten and still has the large concave surface on the windward side of the sail. It lacks the performance of a wing.

U.S. Pat. No. 4,686,921

U.S. Pat. No. 4,686,921 to Magnan, Aug. 18, 1987 has a single batten receptacle with the addition of short fairing members to streamline the mast sock area. This patent is likewise concerned primarily with assisting the shift in sail shape with a change in tack and with maintaining a smooth aerodynamic surface in the mast sock area. It does not create a double surfaced wing and the performance associated with a wing.

U.S. Pat. No. 4,649,848

U.S. Pat. No. 4,649,848 to Belvedere Mar. 17, 1987 has a nose piece and short ribs to create an aerodynamic surface to make a smooth transition from the nose section to the single surface sail which is supported by the traditional full length battens. This patent is primarily concerned with creating an efficient leading edge and smooth sail transition from the mast sock into the main sail area. Again, this design lacks the performance of a wing.

U.S. Pat. No. 4,699,073

U.S. Pat. No. 4,699,073 Farneti, Jan. 23, 1987 shows a double surfaced sail. The two sail surfaces are held apart with a single floating batten in each inducer. The inducer shown is essentially the same as in other art, and uses only a single batten in each inducer. The battens only hold the shape of the curved leeward sail surface. The windward surface is held flat only with sail tension. The disadvantage of this design are that the that the windward sail surface has no support to maintain its shape, and will collapse against the other sail surface when exposed to strong winds or used at high angles of attack.

BACKGROUND—WING SAIL DESCRIPTION

A wing sail is a sail having the cross-sectional airfoil shape of a modern airplane or hang glider wing. A wing sail has two flexible surfaces which are held apart to form the top and bottom of the airfoil. The top surface has a high arched convex surface. The bottom surface is generally flat. As this airfoil is positioned vertically for use in sailing, the top becomes the leeward surface and the bottom becomes the windward surface. A double surfaced wing sail of this type can create much more lift while incurring less drag than a single surface sail. This single performance advantage is why the wing sail is of such interest.

Sails used in propelling craft have these needs: 1- an efficient reversible shape, 2- simple, 3- light weight, and 4- reliable. A less complex sail is easier to use, usually less expensive, and is more reliable. The more parts, lines, and connections a sail has, the more things there are to get stuck, broken or out of adjustment. Failure of a sail can not only be inconvenient, it can also be very dangerous to the craft and the persons aboard. And if a sail is difficult to use, breaks often, or is too expensive, sailors will not use it.

DISCUSSION OF BACKGROUND ART—WING SAILS

Previously available devices create and control the wing shape with a variety of methods, but all have major disadvantages. These designs are either complex, heavy, or are difficult to use. Assembly of the many connectors and lines used in most previously available devices is extremely difficult and time consuming, especially in windy conditions.

Most of the previously available devices have attempted to create a "perfect" airfoil shape to achieve the maximum performance advantage over a standard sail and in the process have ignored some of the basic needs of the craft being propelled. To achieve a better airfoil shape, most previously available devices have fully or partially enclosed the mast inside the sail. The resulting airfoil shape is aerodynamically cleaner, but enclosing the mast ignores the mast strength required to deal with the tremendous forces of the wind and waves in sailing conditions.

Conventional sailing craft achieve a light weight, rigid mast structure with spreaders and diamond wires connected to the mast and side stay wires connecting the mast to the sides of the craft. Enclosing the mast with the sail makes it very difficult to achieve the required mast stiffness by using conventional spreaders and diamond wires. Without external support wires, these designs need a larger and usually very heavy mast structure to achieve the necessary strength and stiffness.

A second problem with enclosing the mast with the sail is that of attaching the sail to the mast and raising the sail. A typical activity at the start of a sailing day is tensioning the battens and raising the sail. At the end of the sailing day the sail is lowered and stowed. The previously available devices make the assembly and raising of the sail on the mast difficult, especially in windy conditions, and that's when we sail! Those experienced in the art will appreciate the difficulty in raising even a single surfaced fully battened main sail. Some of the difficulty is caused by the weight of the sail, and much of the difficulty is caused by the friction of the sail bolt rope against the mast groove. The previously available devices make the task even more difficult by enclosing the mast with the sail. In designs where the sail passes around the front of the mast, the wind presses the sail against the mast causing tremendous resistance to the sail sliding up and down the mast.

A third major difficulty in the creation of a wing sail is holding the two sail surfaces apart from each other for maintaining the desired shape of the sail. The already available devices often have numerous parts making them heavy and complex, or else they are difficult to use, and sometimes exhibit both disadvantages.

U.S. Pat. Nos. 5,249,542 and 4,699,073

U.S. Pat. Nos. 5,249,542 to Latham, Oct. 5, 1993 and 4,699,073 Farneti, Jan. 23, 1987 both have a batten holding device which holds the battens to support only one surface of the wing at a time. The leeward sail surface has a batten but the windward sail surface has no batten.

The inducer in U.S. Pat. No. 4,699,073 to Farneti 1987 is essentially the same as in windsurf art, and the inducer in U.S. Pat. No. 5,249,542 to Latham, 1993 is similar. They use only a single batten in each inducer or receptacle. The battens only hold the shape of the curved leeward sail surface. The windward surface is held flat only with sail tension. The disadvantages of this art are that the windward sail surface has no support to maintain its shape, and will collapse against the other sail surface when exposed to strong winds.

U.S. Pat. No. 4,895,091

U.S. Pat. No. 4,895,091 to Elmali and Elmali, Jan. 23, 1990 maintains the airfoil shape by means of rib sections consisting of spreaders with multiple arms, each arm having rollers on the end. Each sail portion has multiple tracks for receiving the rollers. The leach of the sail is controlled with multiple lines and pulleys or blocks. The disadvantage of this design is that each slider or roller is subject to wearing, getting stuck, or breaking. Each of the many lines must remain in perfect adjustment to apply coordinated tension to the many connections on the sail. These lines are also subject to tangling if the sail is allowed to flog. The sail described in this patent also encloses the mast which causes the disadvantages of requiring a heavy mast structure in the absence of diamond wires and spreaders. And finally, as with all designs that enclose the mast, the raising and lowering of the sail will be difficult when one must drape the sail around the mast.

U.S. Pat. No. 4,757,779

U.S. Pat. No. 4,757,779 to Graneline Jul. 19, 1988 uses a full rib structure consisting of a nose structure, a mast retaining section, a pair of battens, and several sets of cross members with cables. Multiple rib structures are placed around the mast to create the desired airfoil shape. Placed vertically between the nose of each rib structure are inflatable tubular members. These inflatable members create a structure to hold a smooth leading edge. A sail surrounds the entire structure. A line is connected to the trailing edge or leach of each rib structure. These lines come down and are connected to the craft to control the leach of the sail. This design also suggests several cables inside the sail to control the spacing and shaping of the rib structures. The disadvantages of this design are that the complex rib structure and inflatable members would be heavy. The inflatable members and inflating means could also leak or be dislodged.

Further problems with the device disclosed in U.S. Pat. No. 4,757,779 Graneline 1988 are that the numerous lines internal to the sail and those controlling the leach are subject to wear and stretching. The main disadvantage of these lines are that all the lines must remain in perfect adjustment or the sail shaping will not be coordinated and consistent. These lines are also subject to tangling if the sail is allowed to flog.

U.S. Pat. No. 4,757,779 Graneline 1988 encloses the mast with the sail and has the added problem of draping the sail around the mast, connecting the sail to the batten structure and raising the sail on the mast while standing at the base of the mast.

U.S. Pat. No. 4,703,707

In U.S. Pat. No. 4,703,707 Nov. 3, 1987 the sail is shaped with an internal mast and nose piece which has a neutral airfoil template at the top and bottom of the sail area. Multiple batten pairs hold the airfoil in the shape of the templates. This design lacks the ability to control and reverse the airfoil shape. A neutral airfoil relies on angle of attack to create lift, and is inferior to a highly cambered airfoil with a flat bottom. This design offers two methods of attaching the sail to the mast, one with two bolt ropes, and another with one bolt rope. The disadvantage of having two bolt ropes is that the friction of two bolt ropes must be overcome while hoisting the sail onto the mast.

The mast groove to receive the bolt rope is on the front of the mast on both the single and double bolt rope designs. This gives them the added disadvantage of having the sail being pressed into the mast by the wind while trying to hoist the sail. Also, as in other designs, having the mast enclosed creates a mast strength problem and sail handling problem for this design.

U.S. Pat. No. 4,624,203

U.S. Pat. No. 4,624,203 Furguson Nov. 25, 1986 uses a rib structure including a rigid nose piece, a mast retaining section, a large lever piece to assist shaping the aft sail, and multiple spreaders. Multiple rib structures are used the full height of the mast. The nose piece and associated spreaders, lever and battens cause this design to be quite heavy. Once again the sail encloses the mast creating a problem with mast strength. There is no way to connect diamond wires and spreaders to the mast. And as with other designs which enclose the mast, there is the problem of how to drape the sail around the mast, connect each rib section, and hoisting the structure up on the mast. Raising the weight of such a structure on a mast would be a real struggle.

U.S. Pat. No. 4,064,821

U.S. Pat. No. 4,064,821 Roberts and Edmonds Dec. 27, 1977 partially encloses the mast with the sail. This design uses a mast with diverging walls to create a diverging angle in the forward ends of a batten pair. Multiple batten pairs are held in the two sails with traditional batten pockets. Elongated pocket terminators are connected at the forward end of each pocket. Both the right and left sail have a bolt rope which slide into two separate mast grooves on the forward part of the mast. The diverging mast walls cause the forward portions of the battens to bow out, which in combination with a rotatable mast, is used to create the airfoil shape. A line which passes through both sails is used to hold each batten pair against the diverging mast walls.

In U.S. Pat. No. 4,064,821 Roberts and Edmonds 1977, the friction of raising the sail is doubled by having two bolt ropes that must slide into two mast grooves. Additionally, the friction caused by the battens being pressed against the "outwardly extending diverging side walls" of the mast will make raising and lowering the sail very difficult, at least on any vessel larger than a dinghy. With the wind pressing on the sail, raising the sail of this design will be especially difficult.

The assembly of the sail shown in U.S. Pat. No. 4,064,821 Roberts and Edmonds 1977 also requires the connection of a line through the two sail surfaces at each batten terminator location. This is not only a tedious connection, but if the line gets pulled inside the sail, it will be very difficult to retrieve. This design shows only plain battens which will not hold the correct sail shape in strong winds.

Conventional sails simply need a secure clew connection between the sail and the boom. A double surfaced wing sail must connect two sail portions to the boom in such a way that it will not interfere with the airfoil shaping and adjustments, including reversing the sail shape when changing tack.

The trailing edge of the two sail portions of a double surfaced sail will have both a horizontal translation and vertical movement in relation to each other when the sail changes tack.

U.S. Pat. No. 4,064,821 Roberts and Edmonds 1977 offers a method of handling the horizontal translation, but does not compensate for the vertical movement of the sail portions. It connects a horizontal rod to each layer of the sail at the clew point. Downward pressure is applied to this rod from the boom with a roller or block. Downward force is applied to the boom with a conventional main sheet.

The disadvantage of U.S. Pat. No. 4,064,821 Roberts and Edmonds 1977 is that with typical sheeting forces these rods will need to be very strong to avoid bending. They will also likely be heavy which will make them dangerous if the sail is allowed to flog. Furthermore, the bars will not remain horizontal with mainsheet pressure. The pressure at the clew point will likely distort the sail in such a way that once the block is at or near the end of the rod, the rod will likely tip down at that end, and the block will not be able to roll back toward the center. The needed translational movement of the two sail surfaces will be hindered unless the downward sheeting pressure is released. With the release of the sheeting pressure, the sail shape and performance will be lost.

U.S. Pat. No. 4,823,720

U.S. Pat. No. 4,823,720 Foster, April 1989 shows a batten receptacle with a rigid multiaxis joint designed to be connected to a mast with a sail slide. The sail slide is common on larger craft and connects the sail to the mast for making it easier to raise and lower the sail. This patent is primarily concerned with the mechanical attachment of the forward end of the batten holder with the mast and the articulation such an attachment provides for the batten. The advantages alleged include avoiding sail wear and slider binding at the forward batten end of the batten, and making it easier to raise, lower, and flake (fold on the boom) a sail having full length battens.

The disadvantages of U.S. Pat. No. 4,823,720 Foster, 1989 is that the batten holder in this patent holds only one batten per attachment and does not make a wing. This patent only provides for attaching a standard single surface sail and thus lacks the performance a wing can provide.

OBJECTS OF THE INVENTION

In view of the above described state of the art, the present invention seeks to realize the following objects and advantages.

Accordingly, it is an object of my invention to provide a batten retaining and positioning device which positions battens to form the sail into a double surfaced airfoil shape.

It is another object of my invention to provide a camber inducer which can be adapted for use on a windsurf sail or on a sailboat sail.

Another object of my invention is to provide a wing sail which is adaptable to both large and small craft.

It is another object of my invention to provide a wing sail which can be mounted on a standard sail boat or sail board mast, It is another object of my invention to provide a wing sail with a reversible camber, providing an efficient wing shape on either tack.

It is still another object of my invention to provide a wing sail which allows the use of conventional mast rigging and methods of achieving mast support and rigidity.

Another object of my invention is to provide a wing sail which can be raised, lowered, and stowed with relative ease like a standard fully battened sail.

It is another object of my invention to provide a wing sail with fewer parts making it simple, reliable, and inexpensive.

Still another object of my invention is to provide a wing sail which allows the use of conventional sail trimming techniques for adjusting the sail shape to various wind conditions and craft needs.

It is another object of my invention to provide a clew connection which allows the sail to shift while at the same time maintaining the desired sheeting forces.

It is another object of my invention to provide a mast rotation device to assist in shaping a wing sail.

Further objects and advantages of my invention will become apparent from a consideration of the drawings and ensuing description.

BRIEF DESCRIPTION OF THE DRAWINGS

In order to better appreciate how the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

REFERENCE NUMERALS IN DRAWINGS

Figure 1:
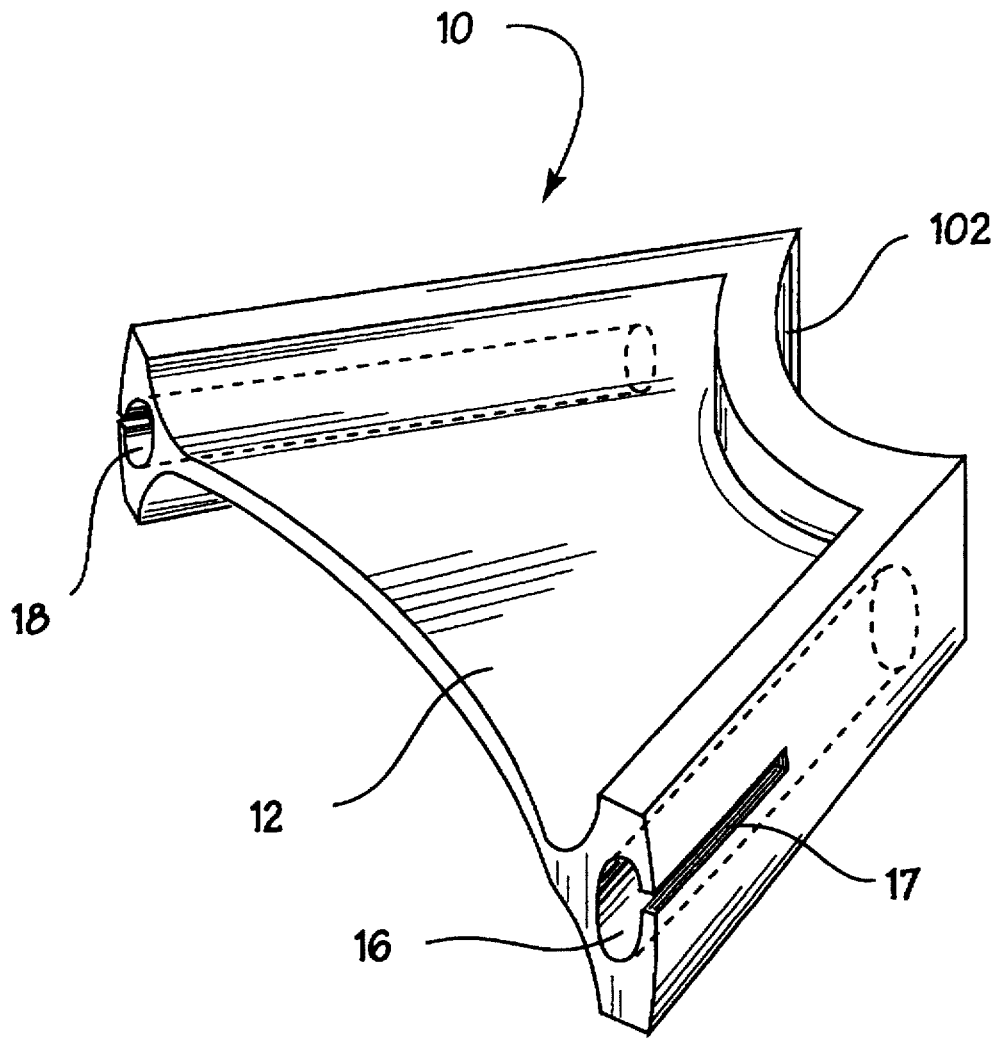
FIG. 1 shows an isometric view of a windsurf inducer.

| | |
|---|---|
| 10, 10a, 10c 10j, 10m, 10s, 10t | inducer |
| 11 | leverage arm |
| 12, 12a, 12j, 12m | inducer body |
| 13 | reinforcing layer |
| 14, 14m, 14c | clamping plate |
| 15 | rivet |
| 16, 16a, 16j, 16m | right batten receptacle |
| 18, 18a, 18j, 18m | left batten receptacle |
| 20 | connecting holes |
| 21 | batten |
| 22 | less flexible section |
| 24 | more flexible section |
| 25 | mid less flexible section |
| 26 | aft flexible section |
| 28 | sliding hook |
| 29 | flexible hook section |
| 30 | closed ring |
| 32, 32m | mast |
| 34 | mast groove |
| 36a, 36b, 36m | mast rotation arm |
| 37 | jib support cable |
| 38 | mast rotation line |
| 39 | jib halyard |
| 40 | rotation line block |
| 44 | mylar layer |
| 46 | bolt rope |
| 48, 48j, 48m | (first) right sail |
| 49, 49m | stitching |
| 50, 50j, 50m | (second) left sail |
| 52, 52m | right batten |
| 54, 54m | left batten |
| 56, 56j, 56m | right batten pocket |
| 58, 58j, 58m | left batten pocket |
| 60 | sliding hook window |
| 64 | batten tensioner strap |
| 66 | batten tensioner buckle |
| 68, 68m | clew attach line |
| 70 | right clew plate assembly |
| 71 | inner clew plate |
| 72 | left clew plate assembly |
| 73 | outer clew plate |
| 74, 74j, 74m | equalizing block |
| 76 | knot extension |
| 77 | cam action arrow |
| 78, 78m | boom |
| 79 | sheave |
| 80 | main sheet line |
| 81 | swivel |
| 82 | jib |
| 84 | jib sheet line |
| 86 | track for batten car |
| 88 | batten traveler car |
| 90 | slug slide |
| 92 | pivot |
| 94 | bolt rope retainer recess |
| 96 | clamp |
| 98 | forward extension |
| 100 | securing clamp cutout |
| 102 | mast contact surface |
| 104 | cloth section |
| 106 | warp direction arrow |
| 108 | stationary edge |
| 110 | force arrow |

-continued

| 112 | bias stretch arrow |
| 114 | cupping shape |
| 116 | cloth section |
| 120 | reinforcing section |
| 122 | zipper |
| 124 | first flexible panel |
| 126 | second flexible panel |
| 128, 128a | mast rotator |
| 130, 130a | housing |
| 132, 132a | spring arm |
| 134, 134a | pivot |
| 135, 135a | housing pivot |
| 136 136a | pivot |
| 140, 140a | mast clamp |
| 142 | rotation sleeve |
| 144 | alternate sail position |
| 146 | alternate sail position |
| 148 | alternate rotation arm position |
| 149 | alternate spring arm position |
| 150, 150a, 150b | connecting slot |
| 152, 152a, 152b | tab |
| 154 | tab mounting layer |
| 156 | slide connector |
| 158 | chanel |
| 160 | batten stop |
| 162 | brace |

BRIEF SUMMARY OF THE INVENTION

The present invention provides a camber inducer for creating a double surfaced sail including methods and devices for shaping, controlling, and adjusting a double surfaced wing sail.

In accordance with one aspect of the present invention, a batten receptacle, also referred to as a Camber Inducer, is provided to hold a pair of battens. Preferably, multiple inducers and batten pairs are placed in the sail to hold the sail in the desired airfoil shape. Two sail surfaces are separated by the inducer and batten structure. Battens are retained in batten pockets on the inside surface of each sail portion. The trailing ends of battens are brought into slidable contact with a sliding hook. In accordance with another aspect of the present invention, a balancing clew method is preferably used to control the clew of the sail. It is also preferred that a mast rotation method be used to assist the inducer in controlling sail shape.

The resulting sail of the present invention has many of the advantages of a rigid wing but has a reversible camber and can be easily raised, lowered, adjusted, reefed and stored like a standard sail.

DETAILED DESCRIPTION OF THE PREFERRED EMBODIMENTS

Figure 2:
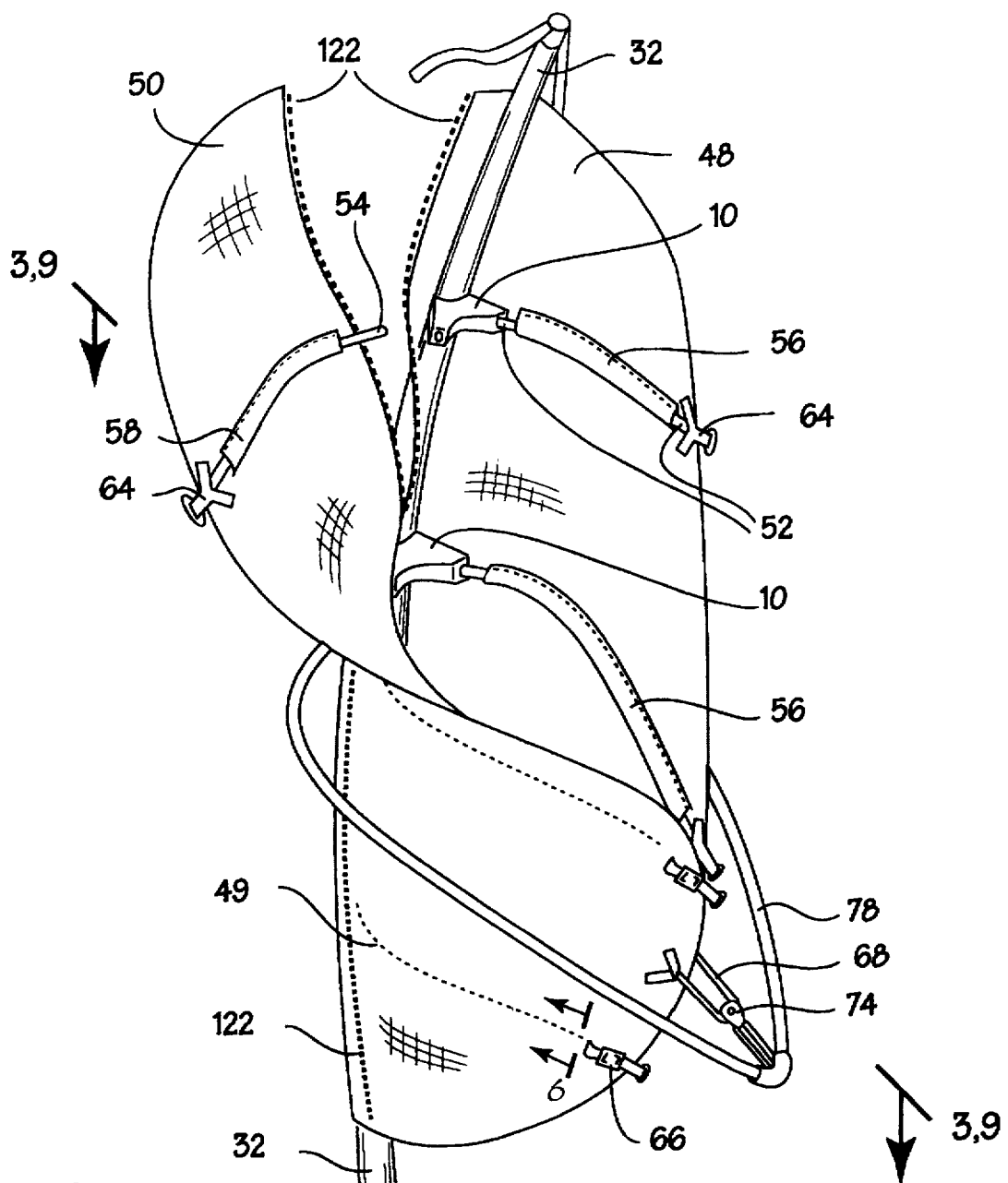
FIG. 2 shows an isometric view of a windsurf sail and mast rig with inducer.
Figure 3:
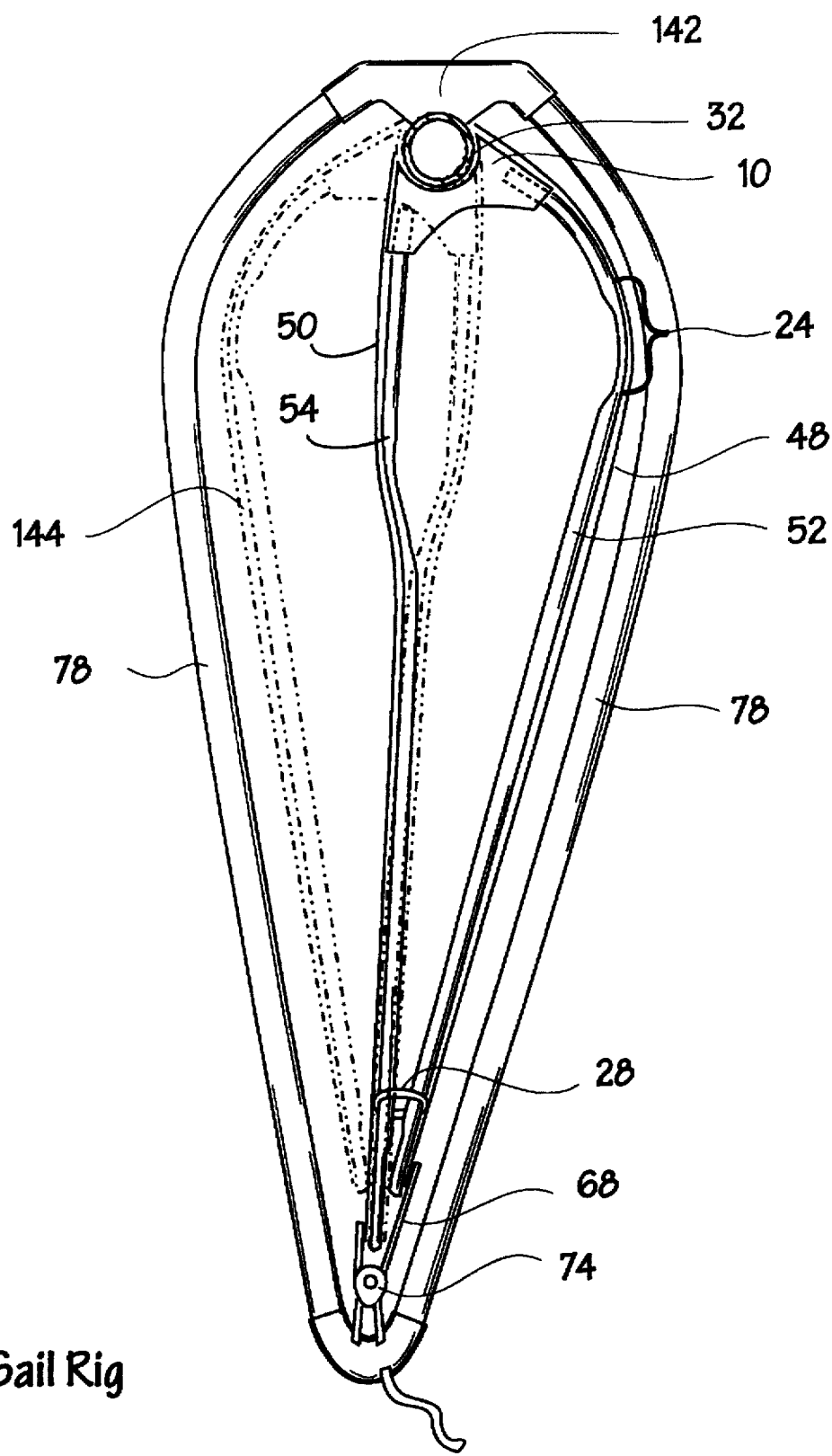
FIG. 3 shows the top view of a cross section of the windsurf rig in FIG. 2.
Figure 4A:
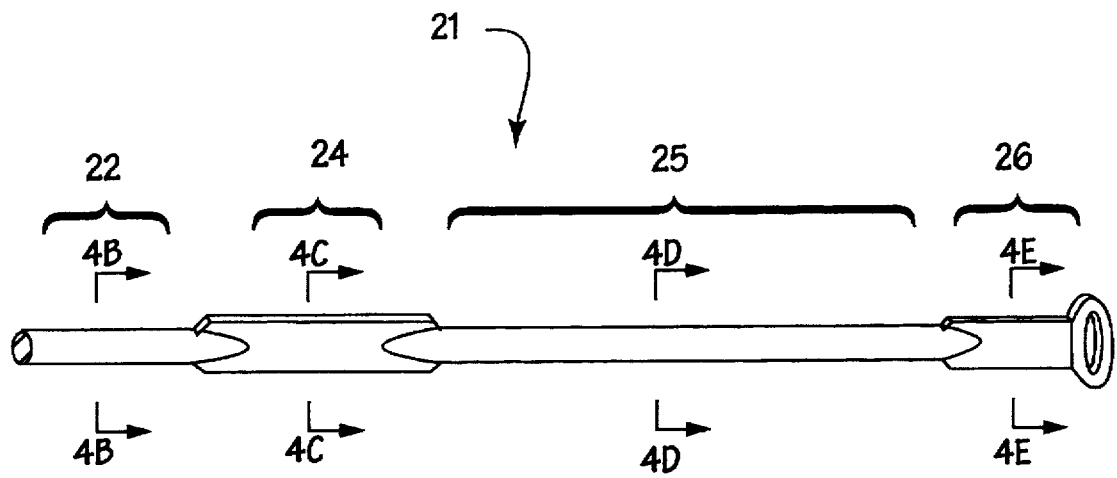
FIGS. 4A to 4E show suggested batten construction.
Figure 4B:
Figure 4C:
Figure 4D:
Figure 4E:

Reference will now be made to the drawings wherein like structures will be provided with like reference designations.
Boardsailing or Windsurf Inducer
Inducer A first preferred embodiment of the inducer for sailboard or windsurf applications is shown in FIG. 1. Inducer 10 has a body 12 to contain and connect all other structures. Body 12 contains a first batten receptacle 16 for the right batten of a batten pair, and a second batten receptacle 18 for the left batten. Batten receptacles 16 and 18 are positioned so that battens exit at a diverging angle from the aft of body 12. Batten receptacles 12 and 18 position the battens so the forward sail portions diverge as shown in FIGS. 2 and 3. Body 12 provides a structure to handle the leverage forces between right and left battens 52 and 54. At the forward end of body 12, there is a crescent shaped surface 102 for resting against the round mast of a windsurf sail rig.

Referring now to FIG. 3, when inducer 10 is resting against mast 32, a smooth surface is formed by the forward part of the sail as it wraps around mast 32 and the outer walls of receptacles 16 and 18.

Referring again to FIG. 1, inducer 10 has an optional slot 17 in the outward surface of receptacles 16 and 18. Slot 17 is provided to accept a portion of the batten pocket into receptacle 16 and 18 to aid in the insertion of battens, and to help hold the inducer in position while rigging the sail. It is to be understood that there are numerous other ways of holding inducer 10 in position such as hook and loop fasteners, buttons, tabs, clamps or rivets. Batten receptacles 16 and 18 can be elongated vertically to allow for angling battens up or down from inducer 10. Optionally, surface 102 can be constructed of a thin flexible layer and connected to body 12 only at the outer edges. Such a construction will allow surface 102 to conform to a variety of mast diameters. Surface 102 can optionally be elongated vertically for better mast support.

Inducer in Windsurf Sail Rig

FIGS. 2 and 3 show a windsurf sail rig incorporating the camber inducer of the present invention to make a wing sail. A standard windsurf mast and boom are used in this embodiment. FIG. 3 also shows the alternate position 144 for reversing the tack of the sail. The disadvantages of enclosing the mast do not apply to windsurf rigs. It is customary in windsurf art to enclose the mast with the sail. Windsurf sails are relatively small and are rigged with the sail lying on the beach where the sailor has easy access to the entire sail. Masts are of sufficient strength, usually being constructed with graphite and fiberglass composites.

The sail consists of a right sail portion 48, and a left sail portion 50. The right and left sail portions 48 and 50, are mirror images of each other and are connected in the luff area to form a continuous sail around the front of the mast. The mast clamp 142 clamps onto the mast 32 through a hole in the sail (not shown) as is customary in the art. A zipper 122 is sewn into the sail just to the side of the mast to provide access to the sail interior for inserting the forward batten ends into receptacles 16 and 18.

The right and left sail portions 48 and 50 have multiple pairs of adjacent batten pockets 56 and 58 sewn into the inner surface of the sail. The batten pockets extend horizontally from luff to leach except for a small gap or window 60 near the leach, as shown best in FIG. 5. Batten pockets 56 and 58 are preferably made from a folded strip of sail cloth and sewn to the inside of the sail with a single row of stitching. Each batten pocket 56 and 58 has a batten tensioning means at the trailing edge or leach of the sail as is typical in the art. A strap 64 and buckle 66 function as one preferred batten tensioning means.

Referring again to FIG. 2, an inducer 10 is mounted at the forward or luff end of each pair of batten pockets 56 and 58. Battens are inserted through the right and left batten pockets 56 and 58 and into inducer batten receptacles 16 and 18 of each inducer 10. A typical sail will have several batten pairs with inducers.

The angle of the batten receptacles cause the inserted battens to arch away from each other at the luff of the sail. The arching pair of battens and their sails are brought together near the leach of the sail by a sliding hook 28 shown in detail in FIGS. 5. and 6. Sliding hook 28 connects to the right and left battens through an opening or sliding hook window 60 on the inner surface of each batten pocket 56 and 58. Sliding hook 28 allows the rear portion of the sails to be held in slidable contact with each other. The length of sliding hook window 60 can additionally be used to limit the relative fore and aft movement of the trailing edge portions of the sail, which affects sail shaping.

Referring to FIGS. 2 and 3, standard rigging is preferably used at the foot and head of the sail for tensioning the sail. The leach or trailing edge of the sail is tensioned with conventional rigging connected to an equalizing block 74. Equalizing block 74 is connected to the rear of the two sail surfaces 48 and 50 with an equalizing line 68. Equalizing line 68 runs through equalizing block 74 with one end connected to right sail 48 and one end connected to left sail 50.

Equalizing block 74 allows the tensioning force applied from the boom to be applied equally to booth right and left sails 48 and 50. Block 74 applies this force to the sail through line 68 without interfering with the relative fore and aft movement of right and left sail portions 48 and 50. The tensioning forces in line 68 are also separated by the diameter of block 74 which minimizes the likelihood of the sails catching on each other as they move fore and aft.

Batten construction

Referring to FIGS. 4A to 4E, batten 21 for the preferred inducer embodiment has a less flexible portion 22 at the forward end, and a more flexible portion 24 in the mid forward section. Mid less flexible portion 25 of the batten is also less flexible, and comprises the major portion of the batten. A more flexible aft flexible section 26 at the aft end of each batten aids in maintaining a smooth transitioning sail surface as the two sail portions 48 and 50 come into slidable contact with each other.

Controlling the flexibility of the batten in this way is employed to assist the inducer in achieving the optimum airfoil shape. The less flexible portion 22 at the front of the batten is necessary to overcome wind resistance and sail shaping forces as it holds the forward sail portions apart from each other.

When a batten pair is in use with inducer 10, the leeward batten forms the high arch of the airfoil as with batten 52 in FIG. 3. The more flexible portion 24 allows the leeward batten to curve from a divergent direction and to bend back toward the other batten at the trailing edge. The mid less flexible portion 25 is then used to hold a consistent shape for both the windward and leeward battens in the aft part of the sail continuing back to the trailing edge. The aft flexible section 26 at the trailing end of the batten allows the two battens to converge smoothly as they are brought together by sliding hook 28.

Batten construction can be accomplished with methods known to one skilled in the art. The flexibility of the battens can be controlled with a variety of methods such as varying the batten thickness, shape, and materials of construction. Materials such as fiberglass, graphite, and foam are common. FIGS. 4A to 4E show an example of using cross section and shape of construction to control flexibility. Cross section 4B has a less flexible solid portion for section 22. A flattened solid cross cross section at 4C provides for the more flexible section 24. A tubular batten at station M provides a lightweight, rigid middle portion for section 25. Section 26 also has a flat cross section shown at cross section 4E.

Sliding Hook

Figure 5:
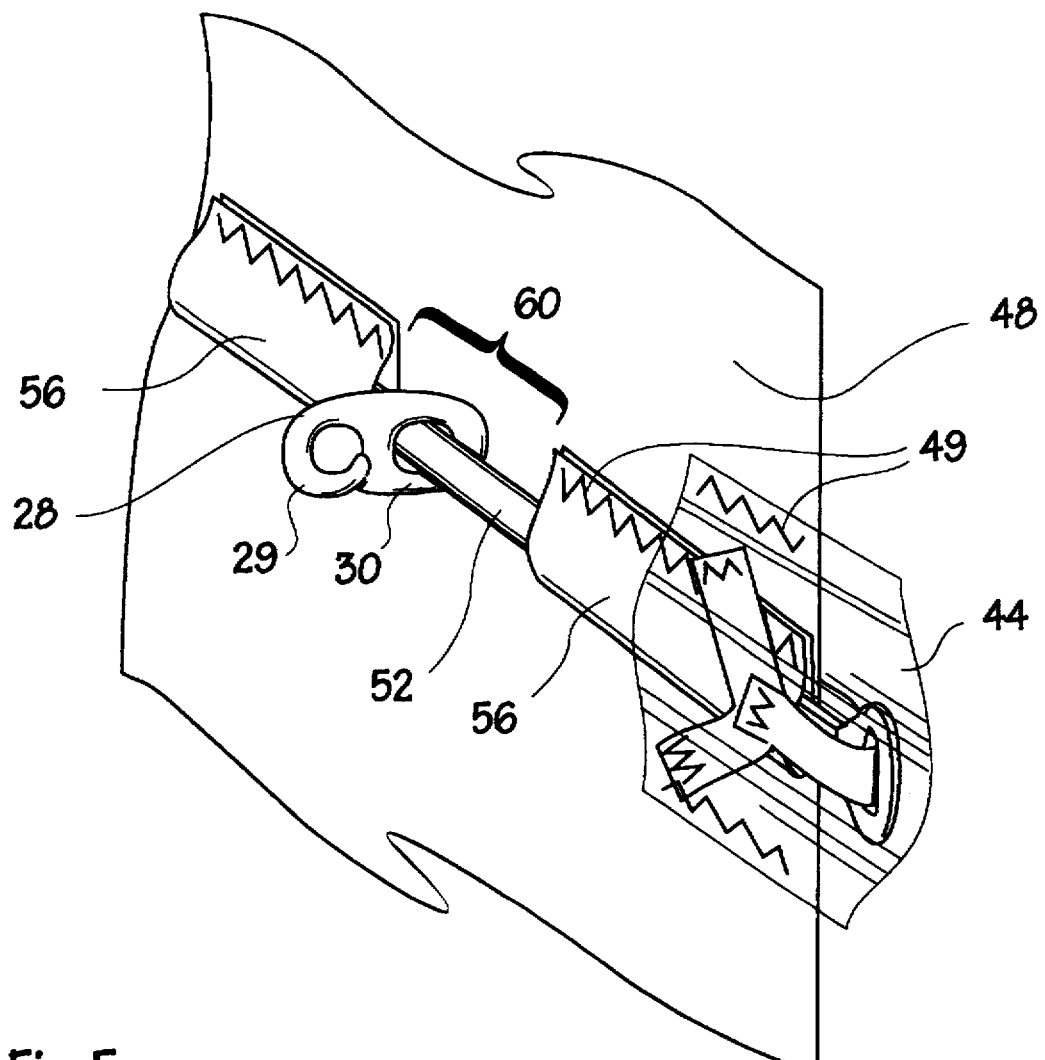
FIG. 5 is an isometric of a sliding hook and sliding hook window.
Figure 6:
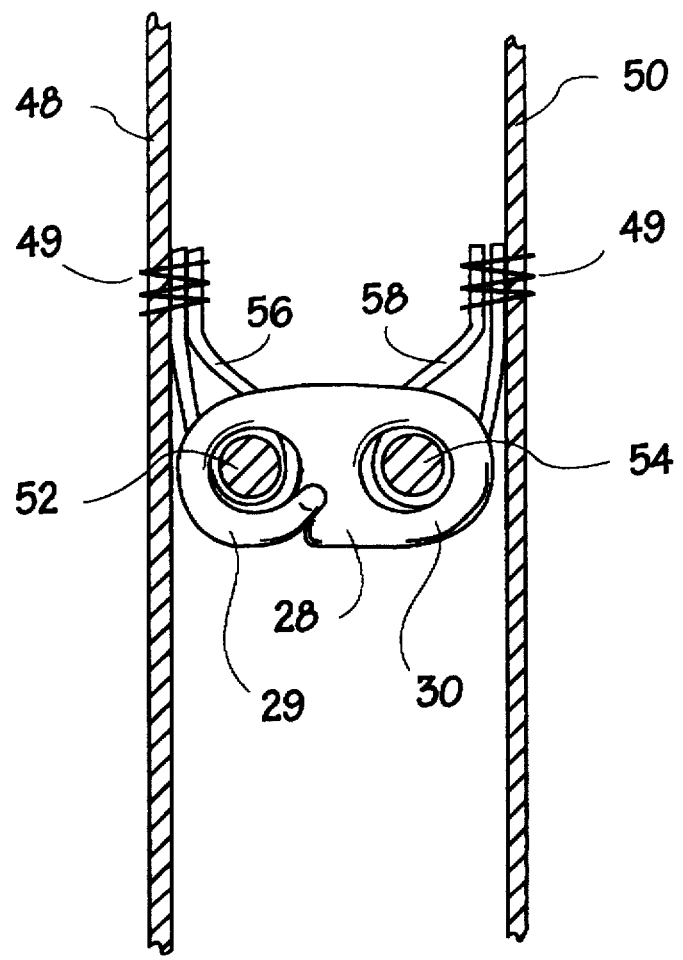
FIG. 6 is a cross section of sliding hook and sliding hook window from FIG. 2.

Referring to FIGS. 5 and 6, one preferred embodiment of sliding hook 28 has a closed ring 30, and a flexible hook section 29. The flexible hook section is to provide a way to easily connect and disconnect one batten at sliding hook window 60.

Sliding hook 28 holds the aft portions of the right and left battens of a batten pair in close proximity, while allowing easy fore and aft shifting of the battens. Sliding hook 28 also allows some limited vertical movement of the right and left sails by virtue of it's dimensions. This vertical movement can be used to assist and/or limit the sail shaping characteristics.

Another preferred embodiment for sliding hook 28 is to construct it with a flexible strap such as polyester webbing. The windsurf/sailboard embodiment does not need an opening and closing hook method and could easily incorporate this embodiment. However, if a reclosable hook for the strap is desired, there are a variety of possibilities. A connecting means such as hook and loop or tab and slot fasteners could be used to connect the ends of the strap.

Operation of Windsurf Embodiment

The wing sail of this first embodiment relies largely on wind pressure during sailing to hold the sail in the desired sail position at either tack. The positive pressure on the windward side of the sail in combination with the negative pressure on the leeward side of the sail is used to push the leeward batten into the desired high cambered arch shown in FIG. 3. The positive pressure of the wind on the windward side presses on the windward sail and batten. The pressure or leverage from the windward batten is transferred to the inducer body, and the inducer body presses the leeward batten outward to create the desired high camber in the leeward sail. The negative pressure caused by the airflow on the leeward side of the sail assists in creating the sail shape by pulling the leeward sail and batten outward.

Reversing tack is done as is customary in windsurf art. A sharp pull on the boom from the new windward side of the sail will reverse the sail camber, and the leverage of the windward and leeward battens in combination with the inducer will again create the designed airfoil shape.

Second Windsurf Inducer Embodiment

Figure 7:
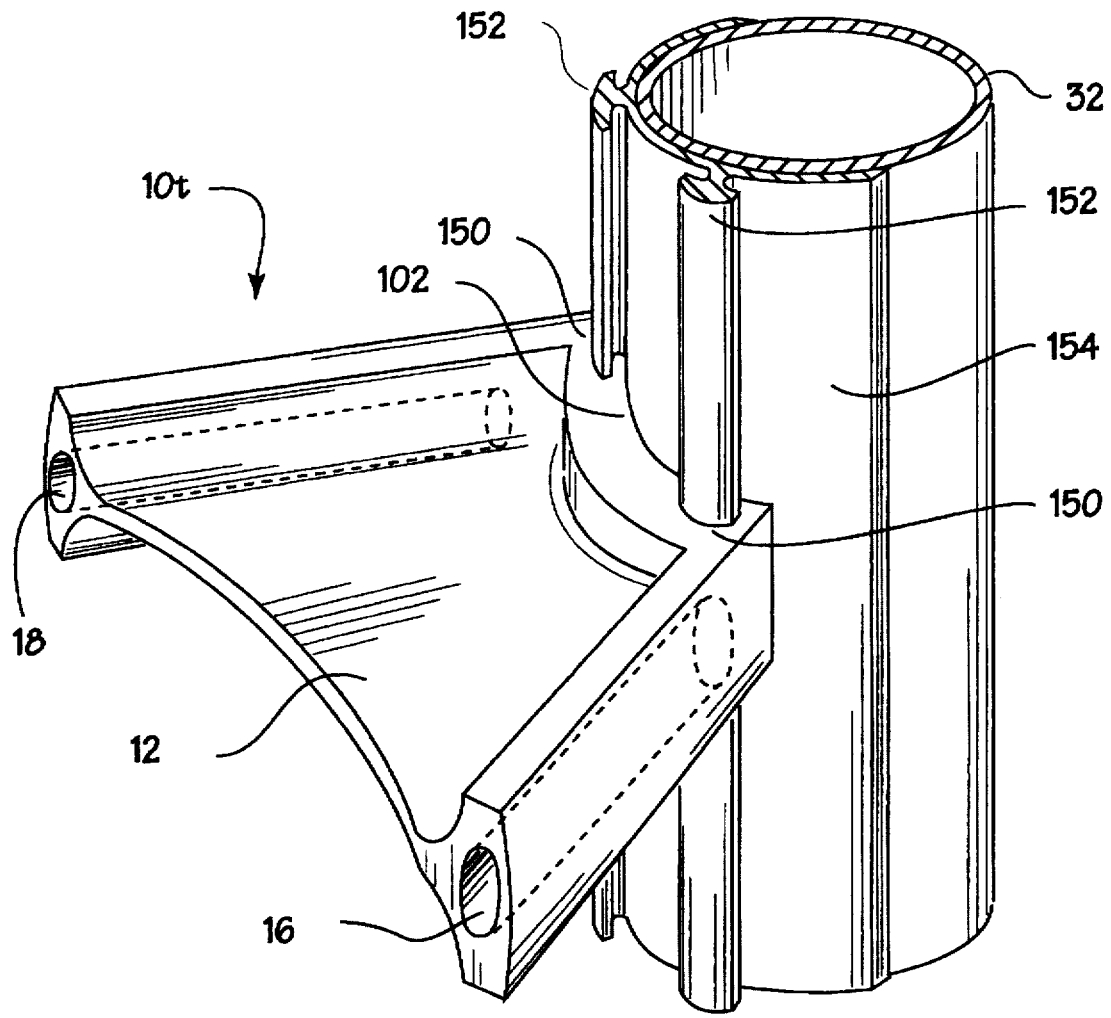
FIG. 7 shows a second embodiment of the windsurf inducer.

FIG. 7 shows inducer 10t, a second preferred Embodiment for my inducer. This embodiment has the same body 12, a first batten receptacle 16 for the right batten of a batten pair, and a second batten receptacle 18 for the left batten. However, there is a modified mast interface. In addition to curved surface 102 to fit against a round mast, there are two slots 150 in curved surface 102. Slots 150 receive tabs 152 which are connected to a backing layer 154. Layer 154 is connected to mast 32 with adhesive or other means.

Mast Rotator for Second Windsurf Inducer Embodiment

Figure 8A:
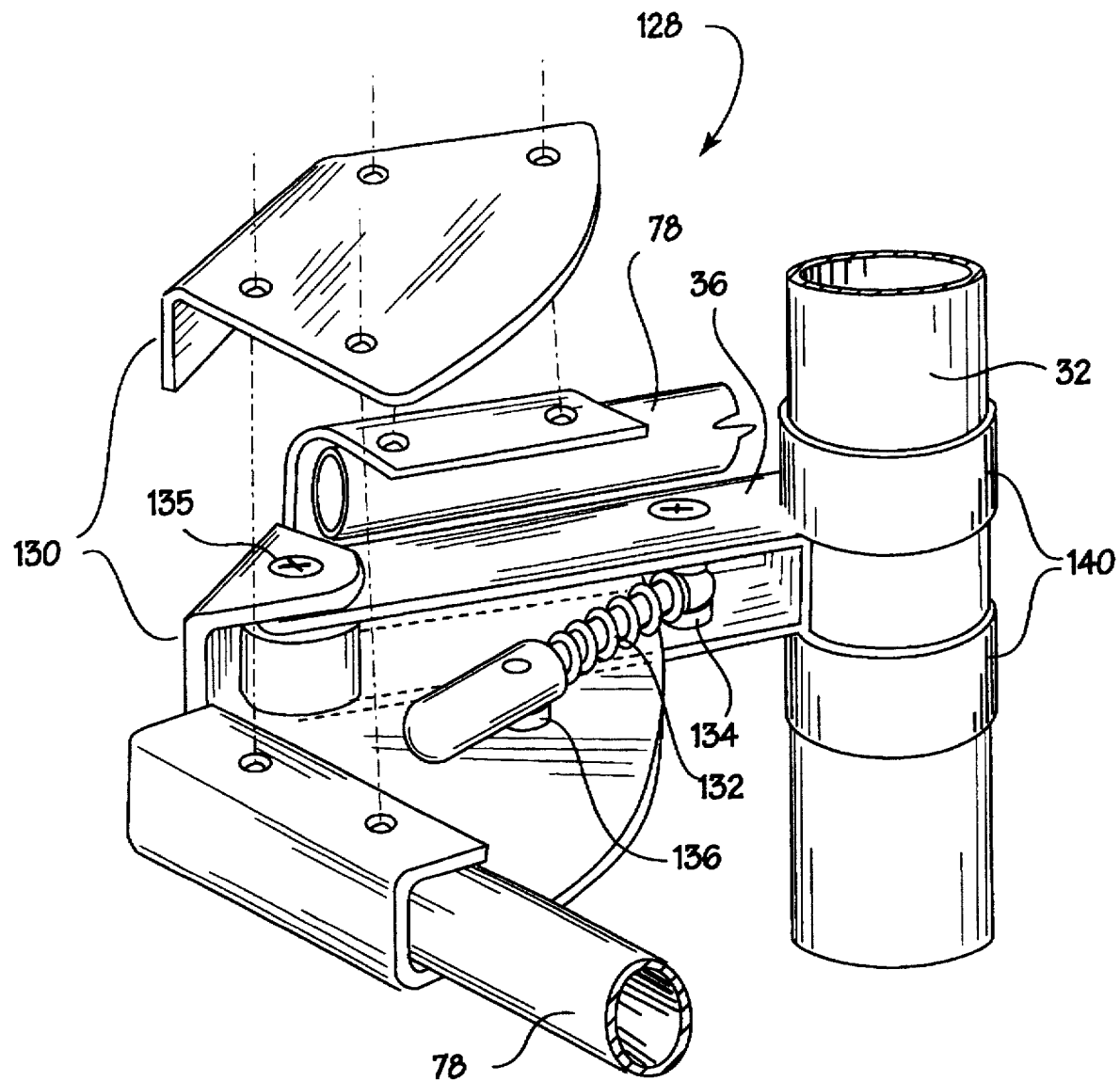
FIG. 8A is an isometric view of a windsurf mast rotation mechanism.
Figure 9A:
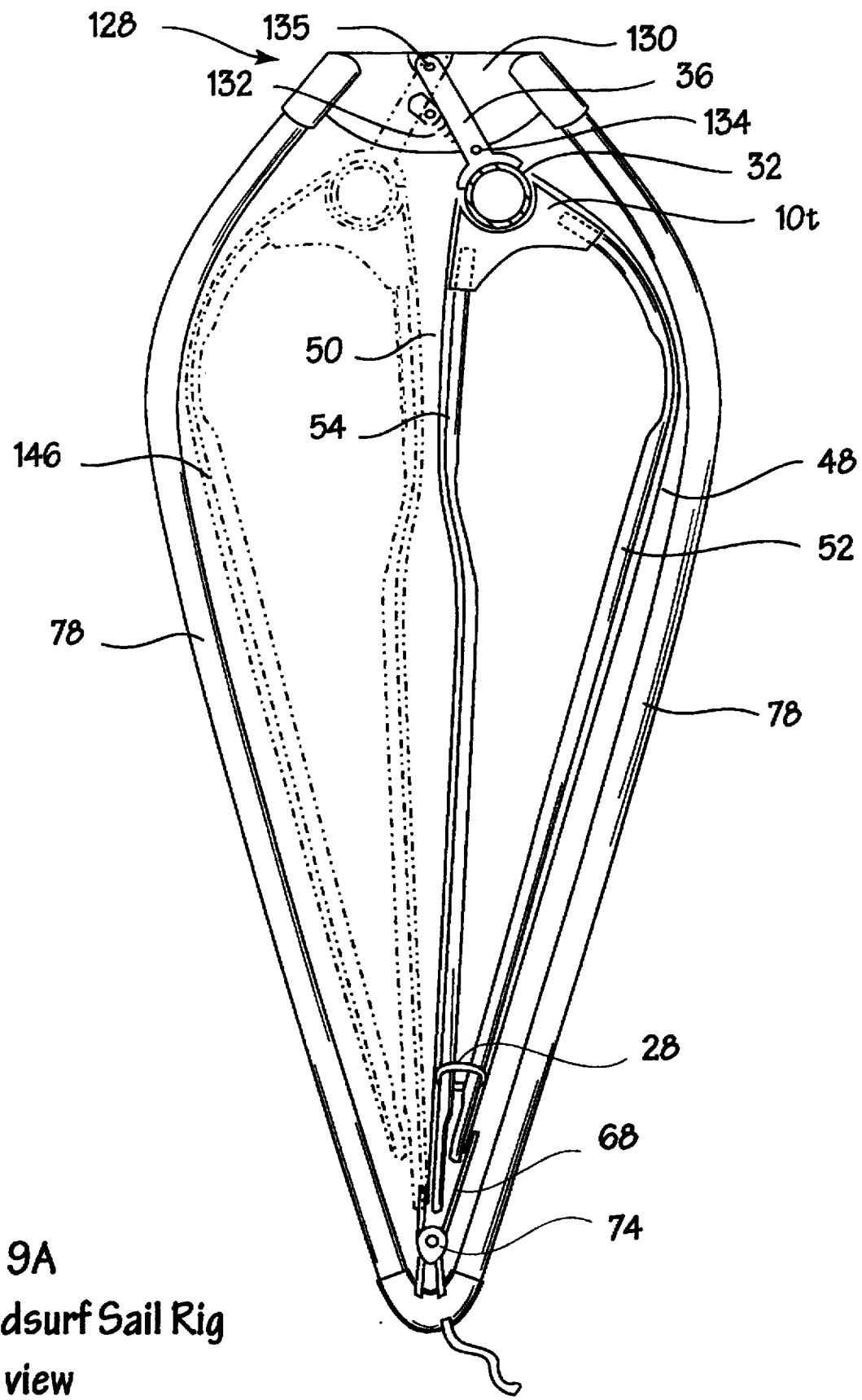
FIG. 9A shows a top view of a section of the windsurf rig from FIG. 2 including a mast rotation mechanism.

Referring to FIGS. 8A and 9A, inducer 10t is preferably used in combination with a method to rotate all inducers in the sail by rotating the mast. A first preferred embodiment of my mast rotator 128 is shown in FIGS. 8A and 9A. Mast 32 is connected to boom 78 by mast rotator 128. Rotator housing 130 is connected to the forward ends of boom 78 replacing standard mast clamp 142 (FIG. 3). Rotation arm 36 is pivotally connected to body 130 at housing pivot 135. The other end of rotation arm 36 has a mast clamp 140 which securely holds mast 32 so it cannot slip or rotate in clamp 142. A spring arm 132 is connected to body 130 at pivot 136 and to rotation arm 36 at pivot 134. Spring arm 132 can compress and expand while transmitting spring pressure to rotation arm 36.

Operation of Second Windsurf Inducer Embodiment

Referring again to FIGS. 8A and 9A, a rotation force is applied to mast 32 by arm 36 pivoting on pivot 135. The rotation of mast 32, in combination with inducer 10t, and battens 52 and 54, form the desired airfoil shape for the sail as shown in FIG. 9A. The rotated position is maintained to one side or the other by spring arm 132. A change in tack is accomplished with a sharp pull on the boom from the new windward side. The positive and negative wind forces on the sail overcome the resistance of spring arm 132, and arm 36 rotates to the opposite side. With the change in tack, the sail assumes the alternate airfoil position 146 shown in FIG. 9A. As an optional aid to rigging the sail, housing 130 and arm 36 can have holes (not shown) which line up when arm 36 is centered. A pin (not shown) can be inserted into the holes which will aid in rigging the sail by holding the mast and inducers centered in a neutral position for inserting and tensioning battens.

Two piece masts are common in windsurf art. When a two piece mast (not shown) is used, the rotational forces on mast 32 caused by mast clamp 140 and rotation arm 36 need to be transferred to the top portion of the mast. This can be accomplished by drilling a small hole in the overlapping joint of the mast (not shown) and inserting a small pin (not shown) through both mast portions and installing a keeper ring (also not shown) to hold the pin in place.

Second Mast Rotator Embodiment

Figure 8B:
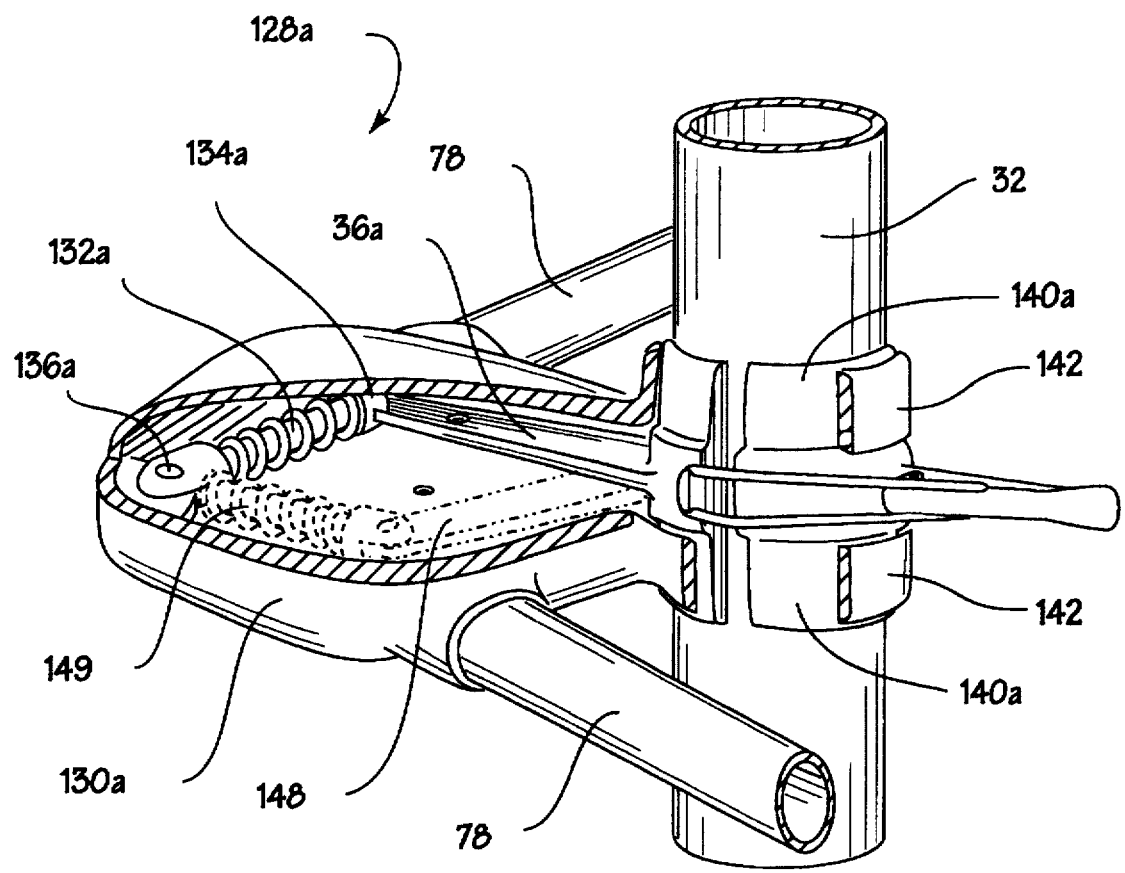
FIG. 8B shows a second embodiment of a windsurf mast rotation mechanism.
Figure 9B:
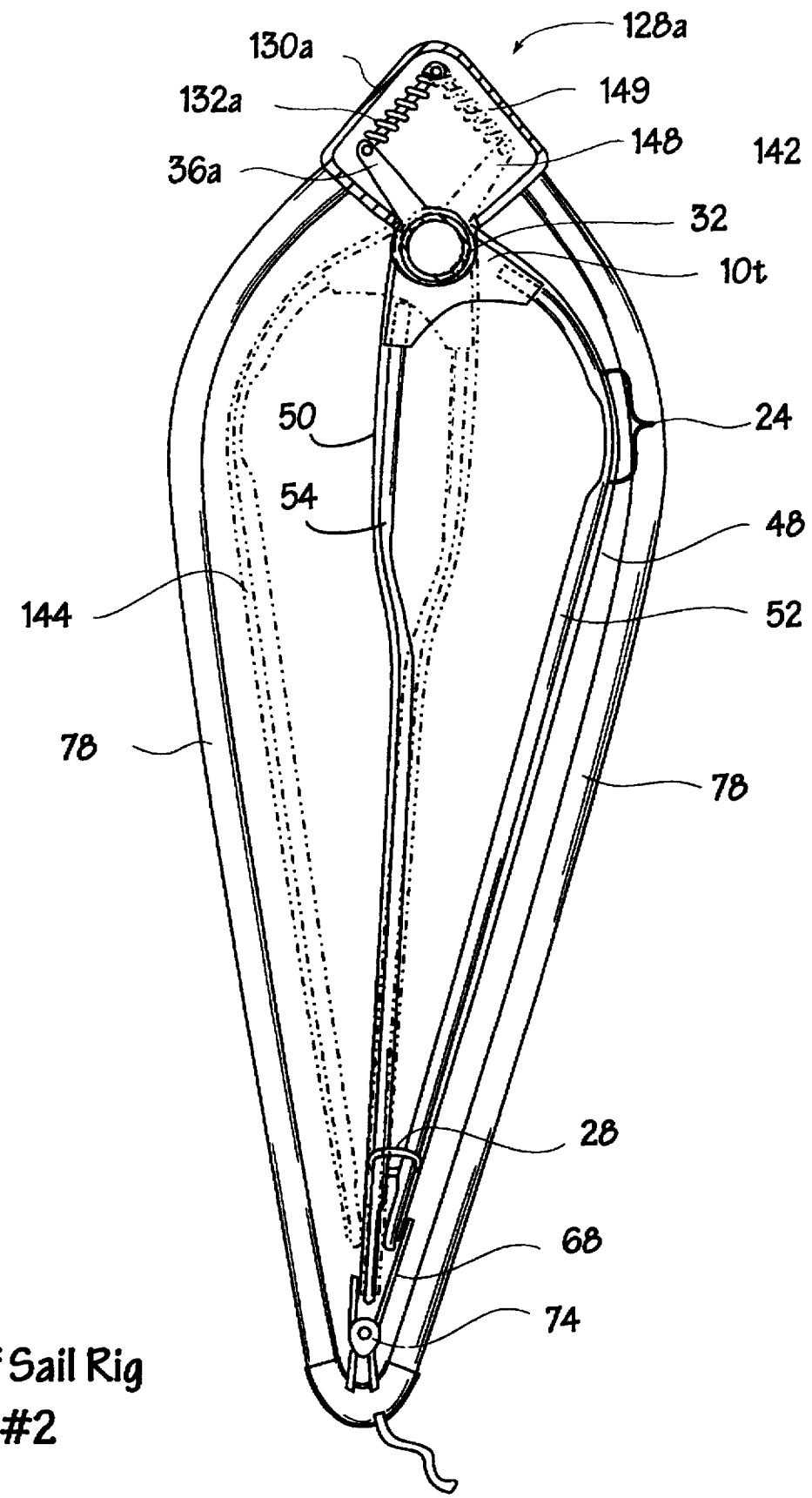
FIG. 9B shows a top view of a section of the windsurf rig from FIG. 2 including a second mast rotation mechanism.

FIGS. 8B and 9B show mast rotator 128a, a second preferred embodiment for my mast rotator. In mast rotator 128a, Body 130a is connected to the forward end of boom 78. A portion of housing 130a extends around mast 32 to form a sleeve 142. Mast clamp 140a encircles and securely holds mast 32 just inside sleeve 142. Mast clamp 140a serves as a bearing surface between mast 32 and sleeve 142 allowing mast 32 to rotate inside of sleeve 142.

Referring again to FIGS. 8B and 9B, arm 36a extends into housing 130a from mast clamp 140a. Spring arm 132a is pivotally connected to rotation arm 36a at pivot 134a and to housing 130a at housing pivot 136a. Spring arm 132a exerts a force on arm 36a that helps maintain mast 32 in a rotated position by holding arm 36a on either side of housing 130a to hold the sail and battens in the desired airfoil shape on either tack.

A third embodiment of my rotator (not shown) is preferably used with inducer 10t and is similar to the second embodiment shown in FIGS. 8B and 9B. The third rotator embodiment consists of housing 130a to connect boom 78 to mast 32. Housing 130a comprises a sleeve 142 which surrounds mast 32. A mast clamp similar to clamp 140a serves as a bearing surface and to keep sleeve 142 from sliding up or down mast 32. Sleeve 142 and the mast clamp allow mast 32 to rotate freely within the housing 130a. This third rotator embodiment relies on wind pressure to hold the sail in the desired shape on either tack.

Inducer Detail

Figure 10A:
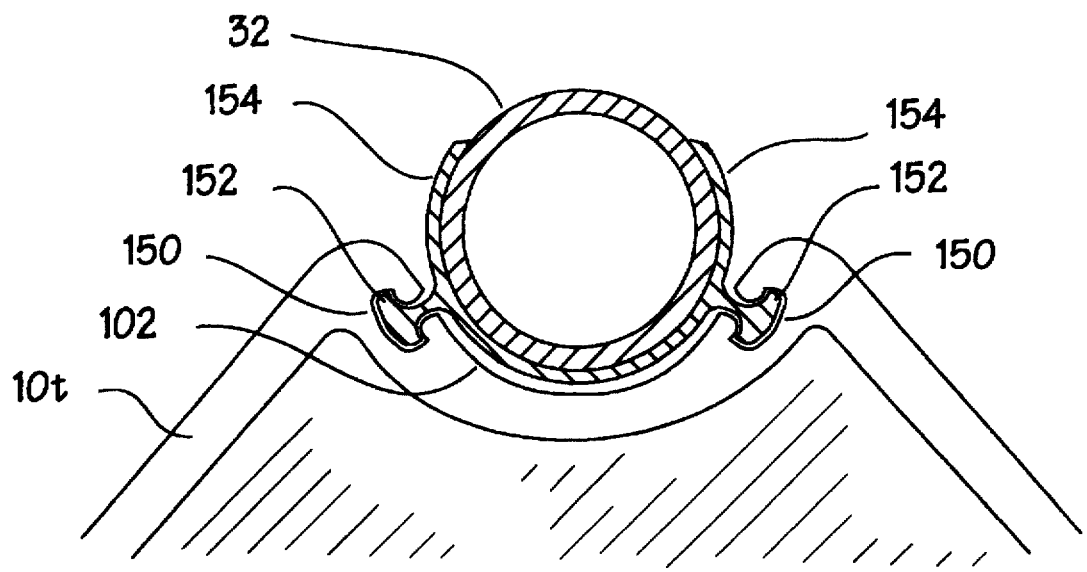
FIGS. 10A and 10B shows detail of the second inducer embodiment and tab connections.
Figure 10B:
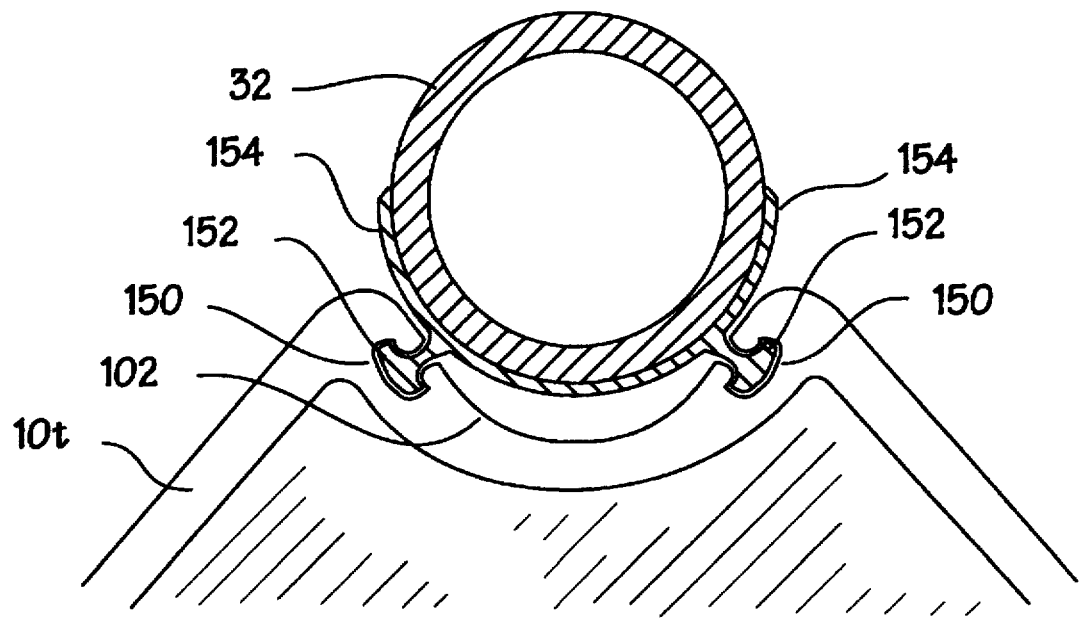

FIGS. 10A and 10B show detail of inducer 10t fitting different diameter masts. The typical windsurf mast is tapered, and so for an inducer to be used at different heights on a mast, it must be able to fit different mast diameters. FIG. 10A shows inducer 10t and tab backing 154 accommodating a small diameter portion of mast 32. FIG. 10B shows inducer 10t and tab backing 154 accommodating a large diameter portion of mast 32.

The tab and slot method of connecting inducer 10t to mast 32 allows inducer 10t to slide vertically on mast 32 as the sail is assembled and tensioned. Vertically sliding inducer 10t also allows the same mast and set of inducers to be used for several different sized sails which will all have different batten spacing.

Figure 12:
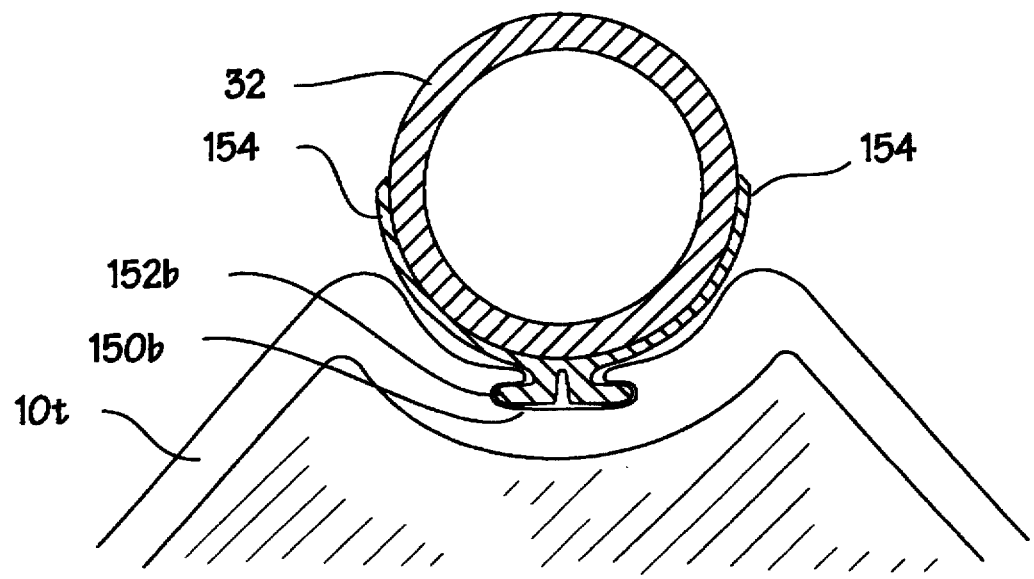
FIG. 12 shows a "T" track tab arrangement for the second windsurf embodiment.
Figure 13:
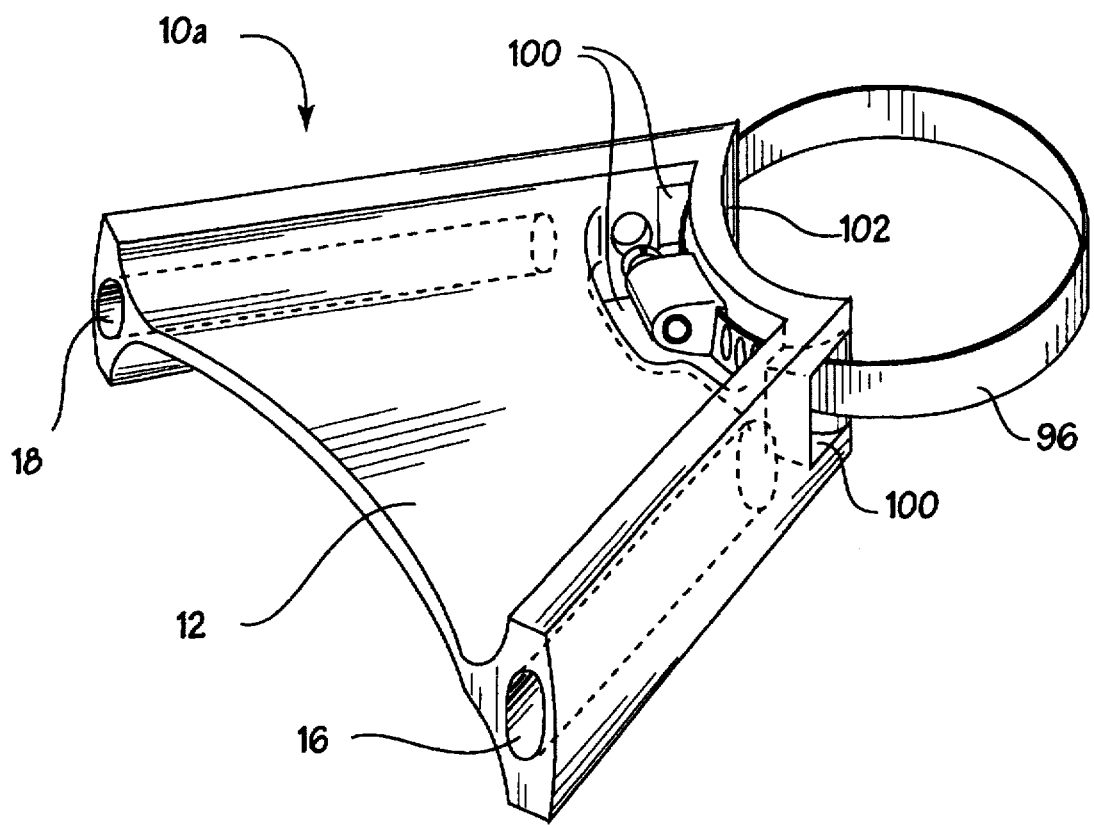
FIG. 13 shows a clamping connection for the second windsurf embodiment.

There are numerous other methods of interfacing my inducer with the sail or mast of a windsurf rig including various clamps, tabs, pins and the like. Two such alternate embodiments are shown in FIGS. 11, 12, and 13.

Figure 11:
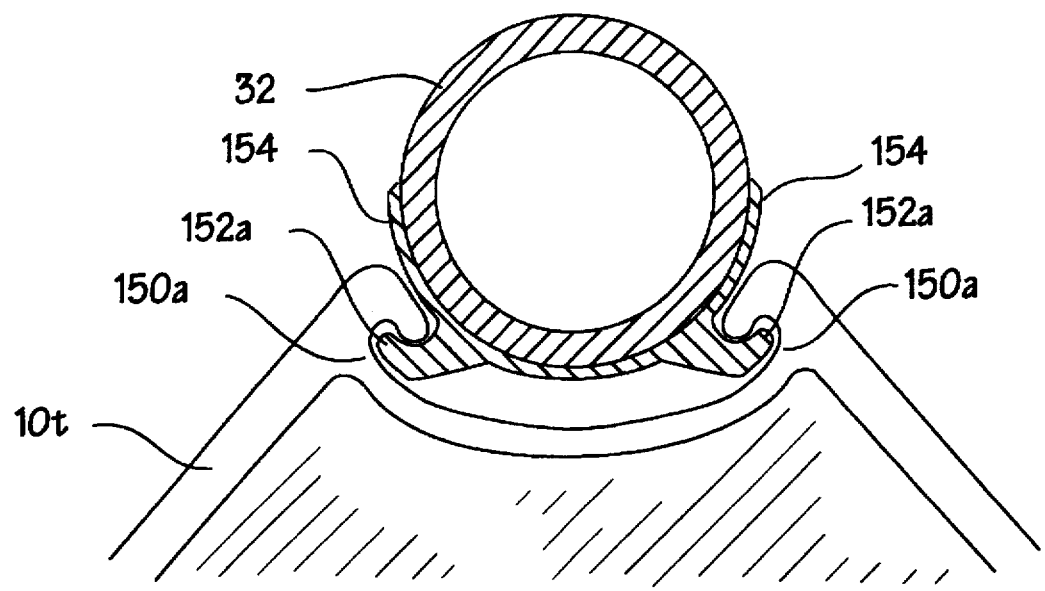
FIG. 11 shows an alternate tab arrangement for the second windsurf embodiment.

FIG. 11 shows a modified tab 152a on backing 154, and a modified slot 150a in body 12. FIG. 12 shows a single "T" shaped track or tab 152b on backing 154, and a single slot 150b in body 12 for receiving track 152b. FIG. 13 shows inducer 10a with a cutout 100 just aft of surface 102. Screw clamp 96 passes through body 12 at cutout 100 and exits the sides of body 12. Clamp 96 provides a means to connect inducer 10a to windsurf mast 32. In still another embodiment of inducer 10 (not shown) surface 102 can also be made flexible so it will fit against the various diameters of the typical tapered windsurf mast 32.

Sailboat Jib Camber Inducer

Figure 14:
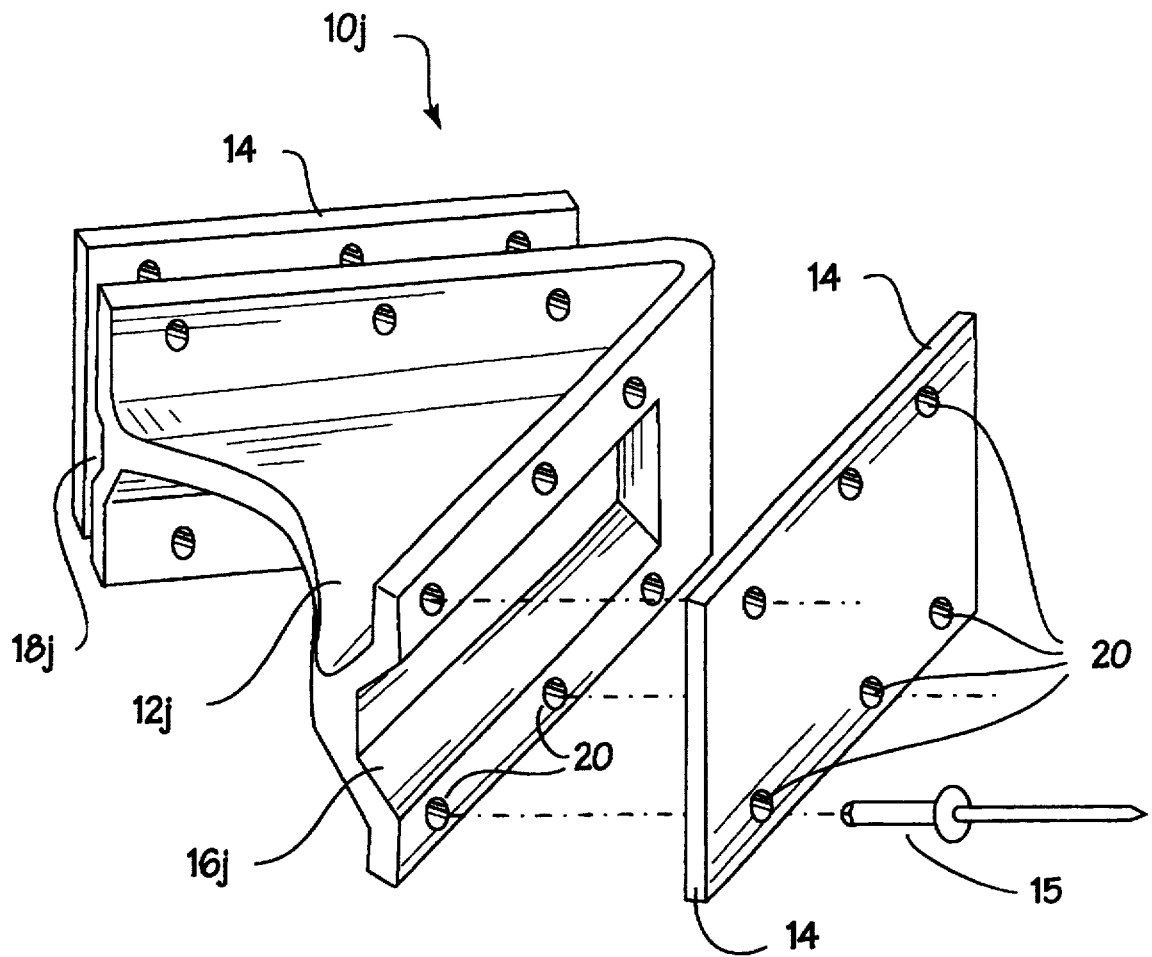
FIG. 14 shows an isometric view of an inducer for a jib.

FIG. 14 shows another preferred embodiment of my inducer. Inducer 10j can be easily applied to a jib, the front sail of a sailboat. Inducer 10j has a body 12j, and two clamping plates 14. Body 12j is generally V shaped. In use, the apex of the V points forward into the wind. Body 12j has structure to withstand and transfer the leverage forces caused by right and left battens 52 and 54 (FIG. 3). Body 12j has batten receptacles 16j and 18j at opposite sides of the V. Batten receptacles 16j and 18j become enclosed on the sides when plates 14 are connected in place with connecting holes 20 and rivets one of which is shown in FIG. 15 at 15.

Figure 15:
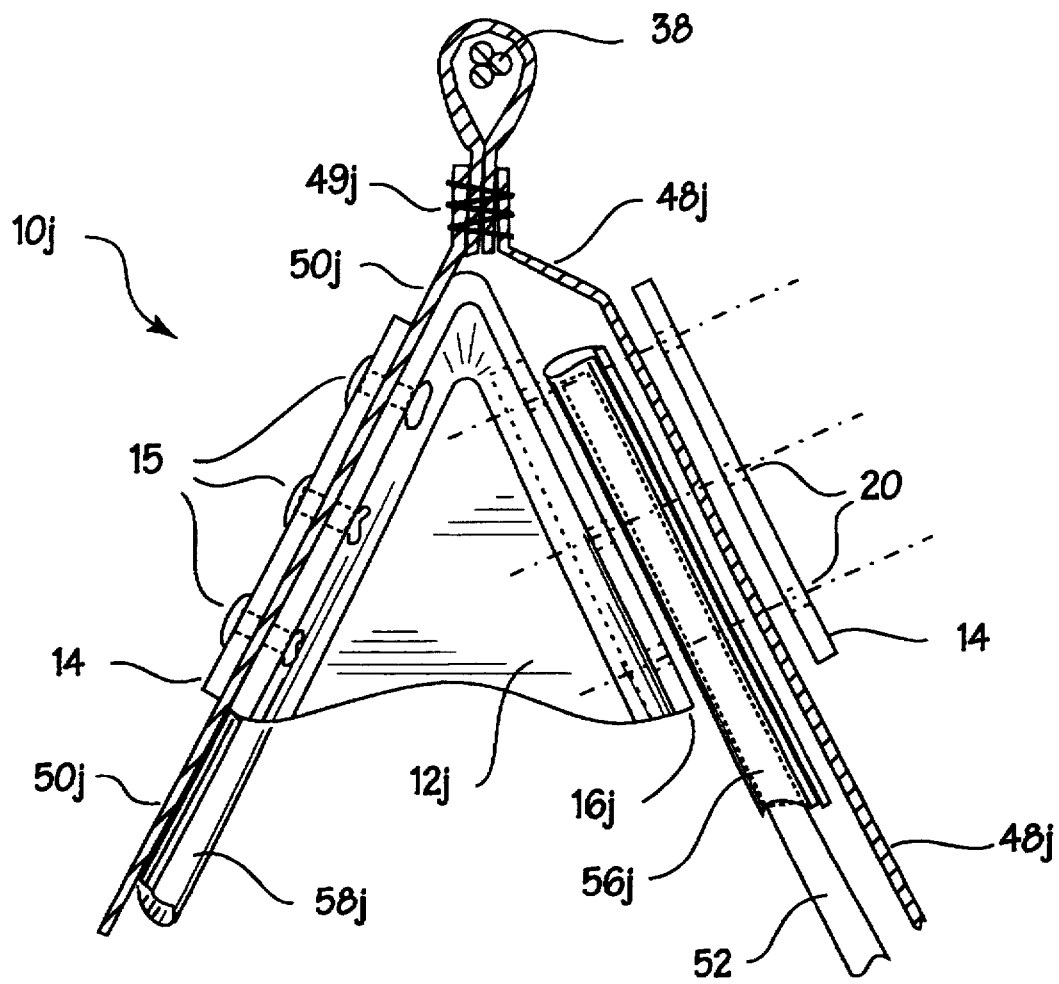
FIG. 15 shows a top view of the jib inducer.
Figure 16:
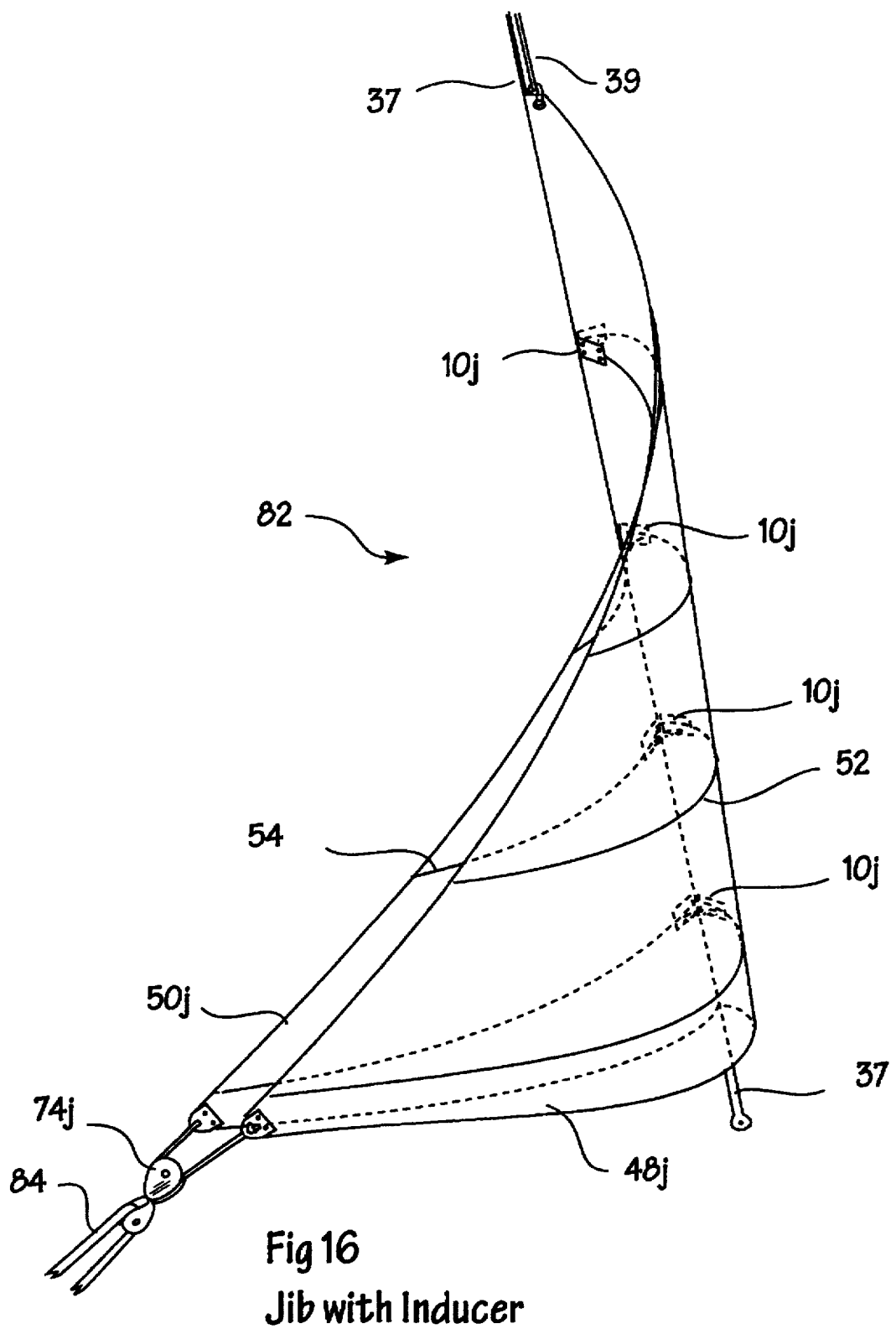
FIG. 16 shows the application of the current invention to the jib of a sailboat.

Referring to FIGS. 15 and 16, inducer 10j is designed to be used with a double surfaced sail. Such a sail is shown in FIGS. 15 and 16. The double surfaced jib is like sewing two jibs together at the luff to form right sail 48j and left sail 50j. As is customary in the art, the jib has a loop of cloth at the luff which surrounds a supporting cable 38 to hold the forward portion of the jib in place. A halyard 39 is connected to the top of jib 82 to raise and tension the sail as is customary in the art.

Referring still to FIGS. 15 and 16, inducer body 12j is positioned between the right sail 48j and left sail 50j, of a double surfaced jib just behind the stitching 49j connecting the two sail portions together. Clamping plates 14 are positioned on the outer surfaces of right and left sails 48j and 50j to clamp the sail portions against body 12j. Rivets 15 extend through clamping plate 14, sail 48j or sail 50j, and connector body 12j to clamp all three together. Right and left batten receptacles 16j, and 18j are formed by the connection of clamping plates 14 on each side of inducer body 12j.

The forward end of each batten pocket 56 and 58 is also sandwiched between inducer body 12j and clamping plate 14. The forward end of each batten pocket 56 and 58 is positioned inside it's respective receptacle 16 and 18. When batten 52 is inserted into pocket 56, the forward end of batten 52 is guided into receptacle 16.

Operation of Jib Camber Inducer

FIG. 16 shows a jib as it would appear in use on a sailboat. Left sail 50j is the windward sail, right sail 48j is the leeward sail. The wind creates positive pressure on the windward sail 50j. The windward sail 50j presses on left battens 54. The forward batten portion presses on inducer 10j. Inducer 10j presses outward on leeward right batten 52. This outward pressure helps to create the high cambered shape in leeward sail 48j.

The leeward sail and associated battens also assist in sail shaping by virtue of the lift created by the sail. The negative pressure caused by the lift of leeward sail surface 48j pulls the leeward sail and batten outward which transfers force through inducer 10 to help flatten the windward sail surface 50j.

Equalizing block 74j applies a balanced force to both right and left sail portions 48j and 50j from the jib sheet line 84. Block 74j allows right and left sails 48j and 50j to shift position upon changing tack. Conventional methods of sail trimming can be used on a jib utilizing my invention.

Sailboat Main Sail Camber Inducer

Figure 17:
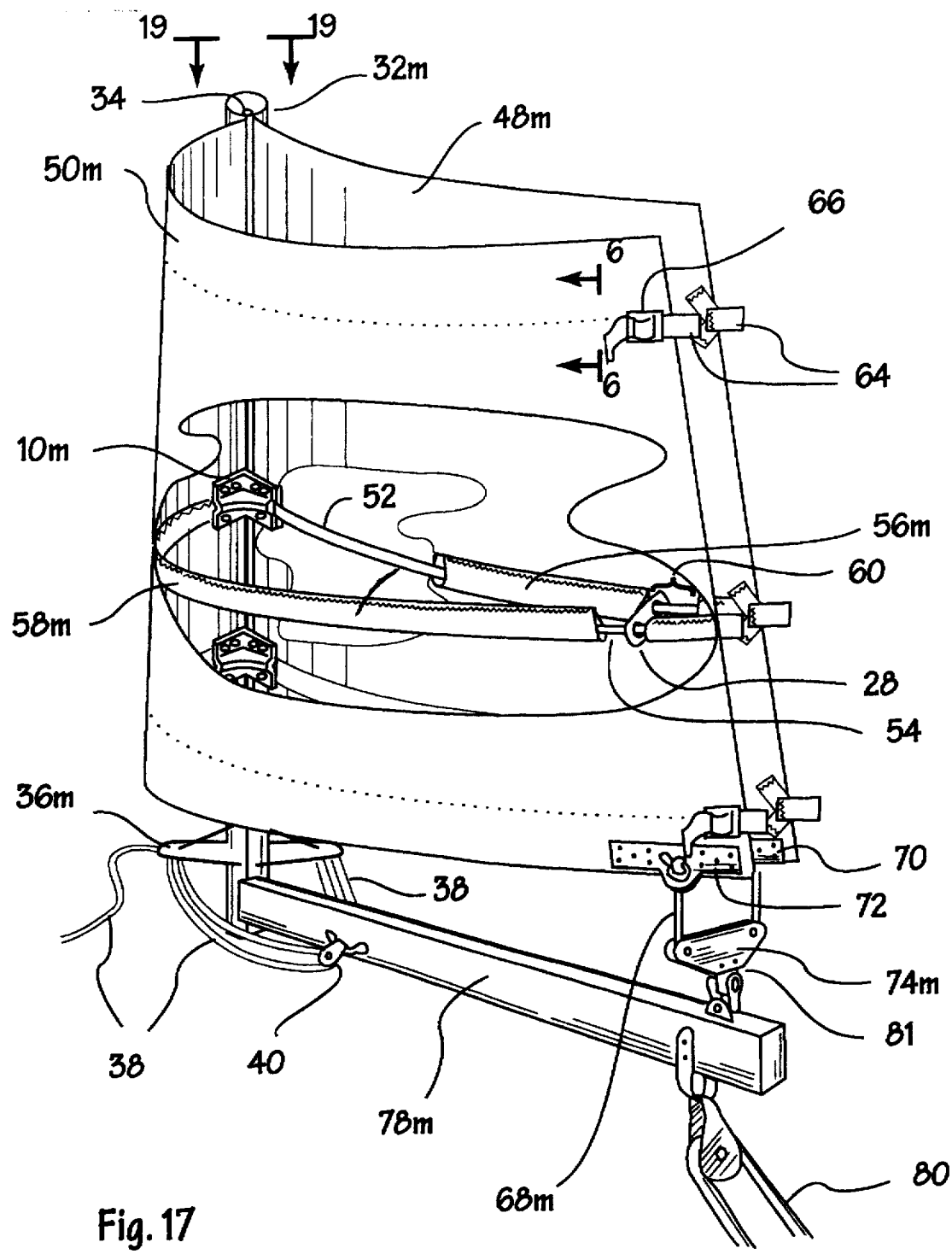
FIG. 17 shows an isometric view of a sailboat main sail with inducer and equalizing block.

FIG. 17 shows a main sail of a sailboat incorporating my invention. Sailboats without a rotatable mast will use inducer 10j. Sailboats with a rotatable mast will use inducer 10m shown in detail in FIGS. 18 and 19.

Inducer

Figure 18:
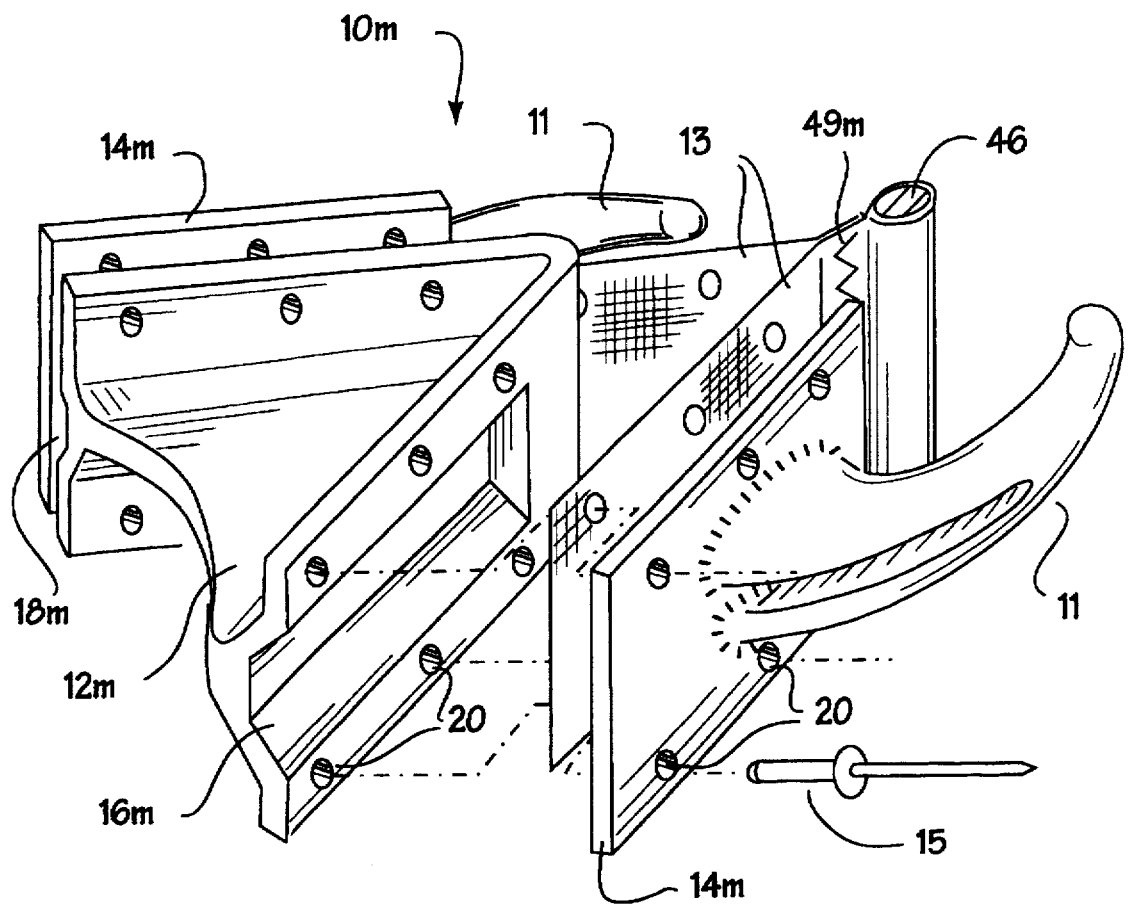
FIG. 18 is an isometric view of a main sail inducer.
Figure 19:
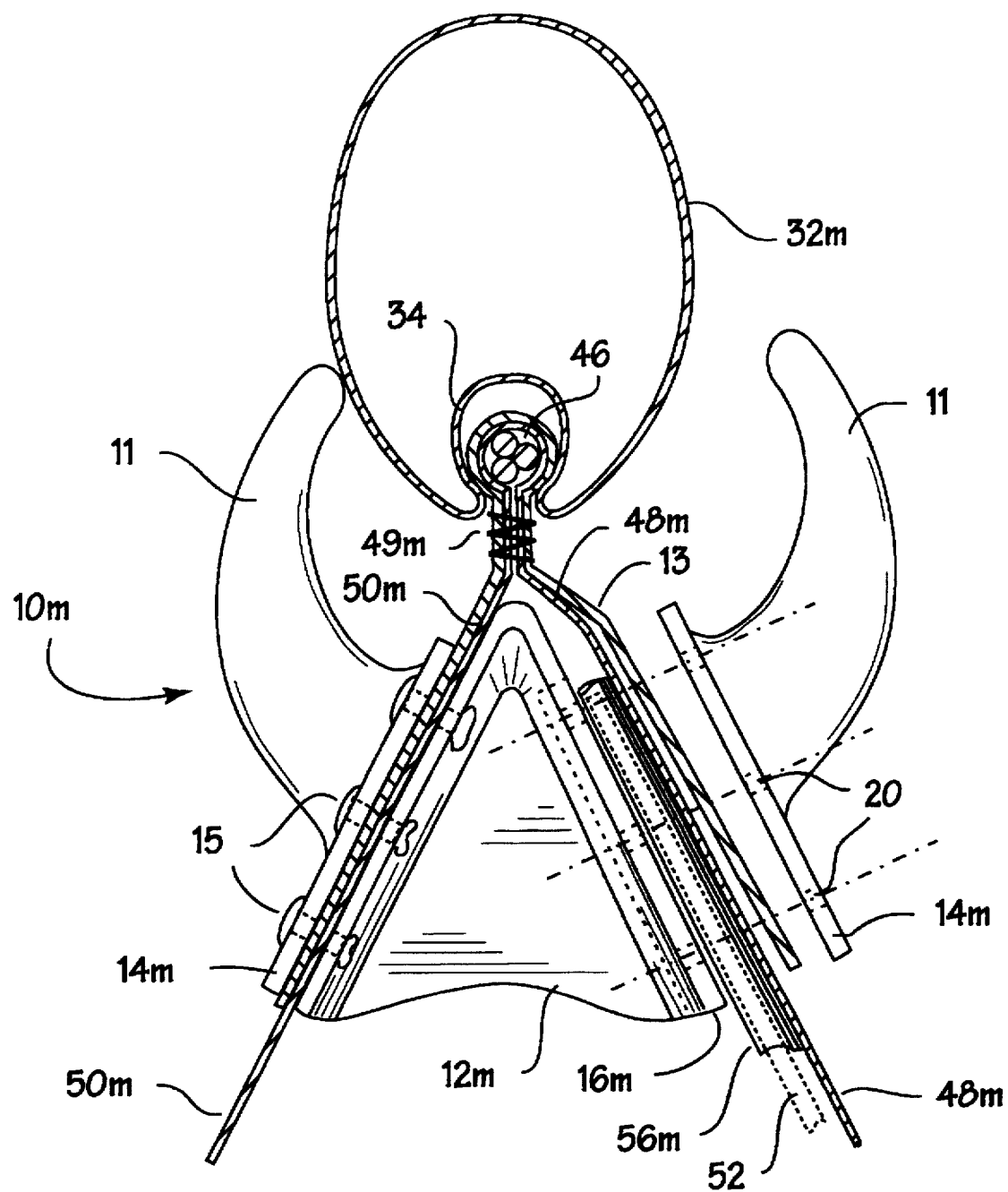
FIG. 19 is a sectional view of the inducer from FIG. 17.

One preferred embodiment of the inducer is shown in FIGS. 18 and 19. Inducer 10m has a body 12m, and two clamping plates 14m. Each clamping plate 14m has a leverage arm 11. The body 12m is generally V-shaped. In use, the apex of the V points forward toward the mast.

As shown in FIGS. 18 and 19, inducer body 12m is positioned between the right sail 48m and left sail 50m, just behind the luff rope stitching 49m of the sail.

Clamping plates 14m are positioned on the outer surface of the right and left sail 48m and 50m. The forward end of each batten pocket is sandwiched between inducer body 12m and clamping plate 14m.

Rivets 15 extend through clamping plate 14m, sail 48m, and body 12m to clamp all three together. Right and left batten receptacles 16m, and 18m are formed by the connection of clamping plate 14m and inducer body 12m.

Leverage arm 11 extends from the outer surface of clamping plate 14m. The forward ends of lever arms 11 extend forward to be in close proximity to supporting mast 32m. Constructing clamping plate 14m and leverage arm 11 with plastic will reduce the friction against mast 32m and avoid marring mast 32m.

Referring to FIG. 18, inducer 10m has an optional reinforcing layer 13 that lays against the outer surface of right and left sail 48m and 50m (FIG. 19). Reinforcing layer 13 extends forward from right sail 48m, around bolt rope 46, and back to lie against the outside of left sail 50m. Reinforcing layer 13 is held in place by clamping plates 14m and connecting rivets 15.

Reinforcing layer 13 is designed to help take the stress on the sail caused by the leverage between leverage arm 11 and bolt rope 46 in mast groove 34. Traditional trimming methods can be used in a main sail incorporating my camber inducer.

Sail

Referring to FIG. 17, the sail consists of a right sail portion 48m, and a left sail portion 50m. The right and left sail portions 48m and 50m are mirror images of each other connected only at a common headboard (not shown) and bolt rope. The bolt rope is designed to be retained by mast groove 34, as is customary in the art. The sail can alternatively use sail slides or sail slugs (not shown) to connect to mast groove 34. The sail also has a conventional headboard (not shown) at the head of the sail for connecting to a halyard line (not shown) for raising and lowering the sail. A conventional downhaul connection (also not shown) is located at the foot of the sail to tension the luff of the sail as is customary in the art. Each sail portion has multiple full length battens carried by batten pockets 56 and 58m sewn to the inside surface of right and left sail 48m and 50m.

Referring again to FIG. 17, the right and left sail batten pockets 56m and 58m form adjacent pairs. The batten pockets 56m, and 58m extend from leach to luff except for a small gap or window 60 near the leach. Each batten pocket has a batten tensioning means at the trailing edge or leach of the sail as is typical in the art. Strap 64 and buckle 66 are shown in this embodiment.

Referring to FIGS. 17 and 19, inducer 10m, is mounted at the forward or luff end of each pair of batten pockets. Body 12m is positioned inside the two sail portions 48m and 50m at the luff. Plates 14m are positioned on the outside sail surfaces to clamp sails 48m and 50m between body 12m and plate 14m.

The forward end of each batten pocket is sandwiched by the inducer clamping plate 14m on the outside of the sail, and the inducer body 12m on the inside of the sail forming batten receptacles 16m and 18m.

Referring again to FIGS. 17 and 19, battens are inserted into batten pockets 56m and 58m at the leach and are guided into batten receptacles 16m and 18m of inducer 10m. The angle of the batten receptacles 16m and 18m cause the battens to arch away from each other at the luff of the sail.

The arching pair of battens and their sails are brought together near the leach of the sail by sliding hook 28. Sliding hook 28 connects to right and left battens 52 and 54 through sliding hook window 60 on the inner surface of each sail. Sliding hook 28 allows the rear portion of the sails to be held in slidable contact with each other.

Clew Connection

Figure 20:
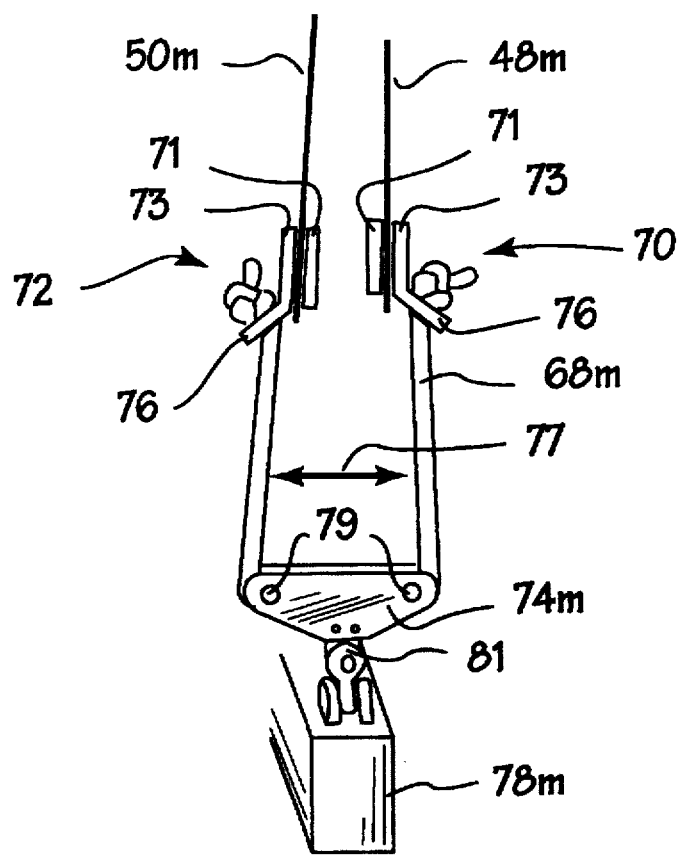
FIG. 20 shows the boom to sail equalizing block and clew connection.

A clew plate assembly is shown in FIGS. 17 and 20. Each clew plate assembly consists of an outer clew plate 73 and inner clew plate 71. Sail portions 48m, and 50m are sandwiched between the outer and inner plates 73 and 71.

Outer plate 73 has a knot extension 76, with a hole for connecting line 68m. Line 68m is retained in the outer plate with a knot such as a figure eight knot. Line 68m runs from the knot extension 76 of right clew plate 70, downward through equalizing block 74m and back to knot extension 76 of left clew plate 72 where it is secured with a second figure eight knot.

Line is one preferred connector means because it is strong, light, flexible, inexpensive, and easy to replace when it gets worn. Line 68 can also be constructed from steel cable and connected with pins or shackles. Clew plate 70 and 72 are constructed of traditional materials such as aluminum, and use common mounting methods such as rivets.

Equalizing block

Referring again to FIGS. 17 and 20. Equalizing block 74m is constructed from two aluminum plates which sandwich two small sheaves 79. A swivel attachment 81 provides for connection to boom 78m with a conventional shackle. Equalizing block 74m is able to rotate about its mounting point on the boom by virtue of swivel 81.

Equalizing block 74m allows the sheeting force applied to the boom with main sheet 80 to be applied equally to booth right and left sails 48m and 50m. Block 74m applies this force to the sail through line 68m without interfering with the relative fore and aft movement of right and left sail portions 48m and 50m. The downward sheeting forces are separated by the distance between sheaves 79. Thus, both right and left sails 48m and 50m have a vertical or nearly vertical sheeting force applied. The distance between sheaves 79 is appropriate for the fore and aft movement of right and left sails 48m and 50m.

As right and left clew plates 70 and 72 are shifting fore and aft (as when changing tack), equalizing block 74m serves as a cam to separate the right and left plate assembly 70 and 72. The camming action is shown by a cam action arrow 77 in FIG. 20. Camming action 77 stops the two plates from catching on each other as they pass each other in their respective fore and aft movement when changing tack.

Boom

Referring to FIG. 17, a conventional boom 78m is connected to mast 32m with conventional connection means (not shown). Boom 78m is able to pivot in relation to the mast 32m. A conventional main sheet line 80 is connected to the boom 78m.

Mast

Referring to FIG. 17 and 19, a conventional mast is used in this embodiment. Mast 32m has a mast groove 34 which retains bolt rope 46 (FIG. 19) of the sail. Mast 32m also has customary means to raise and lower the sail (not shown). Mast 32m is preferably a rotatable mast for use of inducer 10m. A non rotatable mast would require the use of inducer 10j.

Rotation arm

Referring to FIG. 17, rotation arm 36m is mounted on mast 32m near boom 78m. Outward ends of arm 36m extend slightly forward of mast 32m. Rotation arm 36m is only applicable to rotatable mast embodiments.

Lines 38 pass from the outward ends of the rotation arm 36m, and connect to the boom with block 40. Blocks 40 are used as necessary for the appropriate mechanical advantage to induce a rotation in mast 32m. Each rotation arm line 38 has a cleat (not shown), for securing the line 38 at the desired rotation. Lines 38 have one or more rotation line redirection blocks (not shown), to lead lines to the crew area, and to align line 38 for cleating. Lines 38 lead to a point which is accessible by the crew for cleating and releasing the line.

Batten Traveler Car Embodiment

Figure 21:
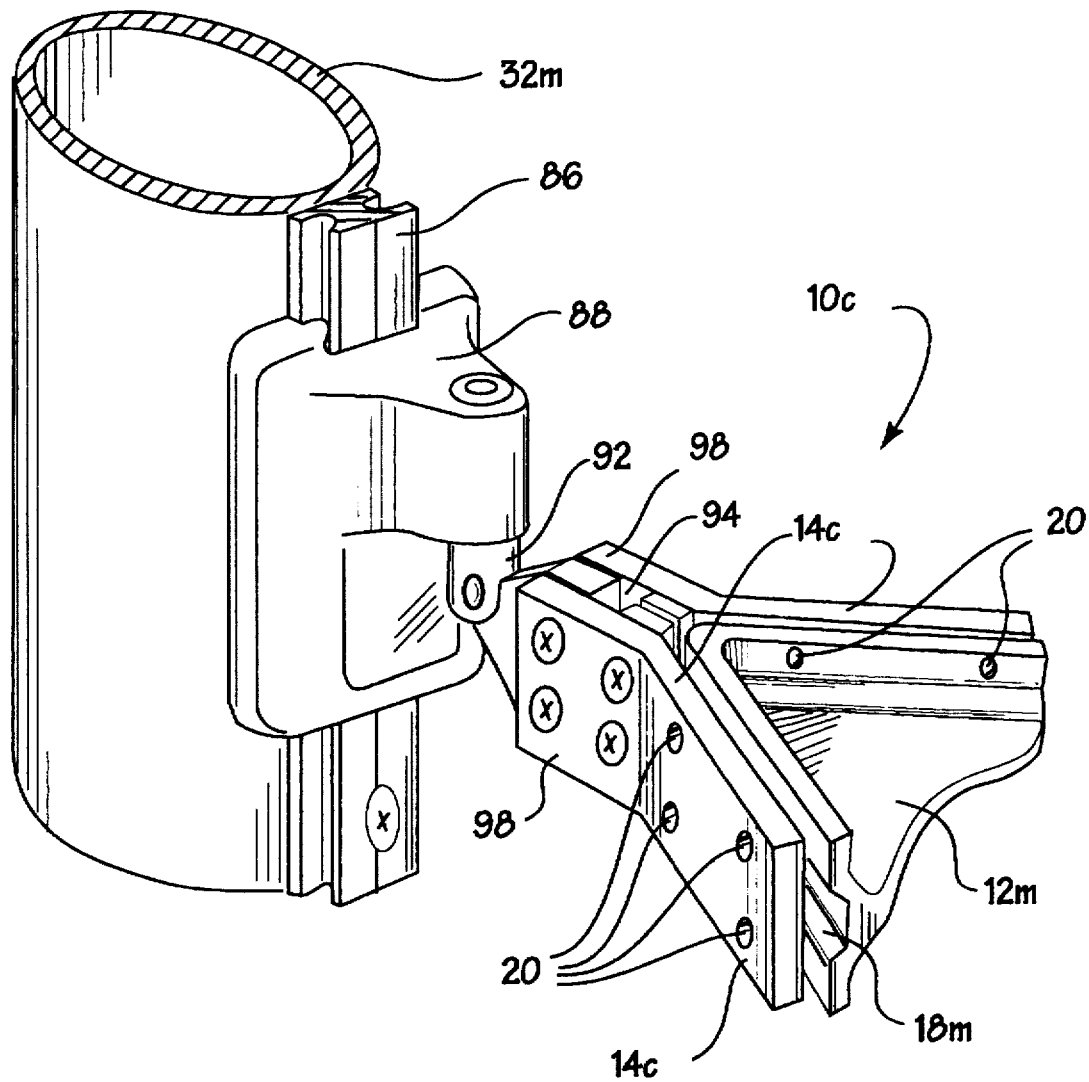
FIG. 21 shows an embodiment of the inducer applied to a batten traveler car.

FIG. 21 shows a third preferred embodiment for my inducer applied to a sailboat batten traveler car. A typical traveler car system is shown. As is common in the art, a track 86 is attached to mast 32m. A car 88 slides on track 86. Car 88 has a pivot connector 92 which inducer 10c is mounted to. Pivot connector 92 can be designed to allow inducer 10c to pivot in two or three axis of rotation.

Referring again to FIG. 21, inducer 10c has a body 12m with recesses for batten receptacles 16m and 18m. Right and left sail portions 48m and 50m are clamped against body 12m with right and left clamping plates 14c just as in the previous embodiment. Plates 14c also form part of batten receptacles 18m and 16m. Clamping plates 14c have a forward extending portions 98 which provide a connection means to connect to batten car 88 at pivot 92. Extensions 98 also form a recess 94, which serves as a bolt rope retainer to clamp and hold bolt rope 46 of the sail.

Batten car 88 allows inducer 10c to pivot about a non rotating mast, while still positioning the opposing battens of a batten pair at the correct angle to form a double surfaced airfoil. Such a sail can be flaked with both right and left battens inserted in inducers 10c or just one batten of each pair can be pulled out of its receptacle in order to flake or otherwise collapse the sail.

Plate 14c can additionally have a leverage arm like leverage arm 11 in FIG. 11 for use with batten car 88 and a rotatable mast. Such an arrangement would preserve the ease of raising and lowering the sail provided by batten car 88 and still have the positive control offered by a rotatable mast.

Additional Embodiments

Figure 22:
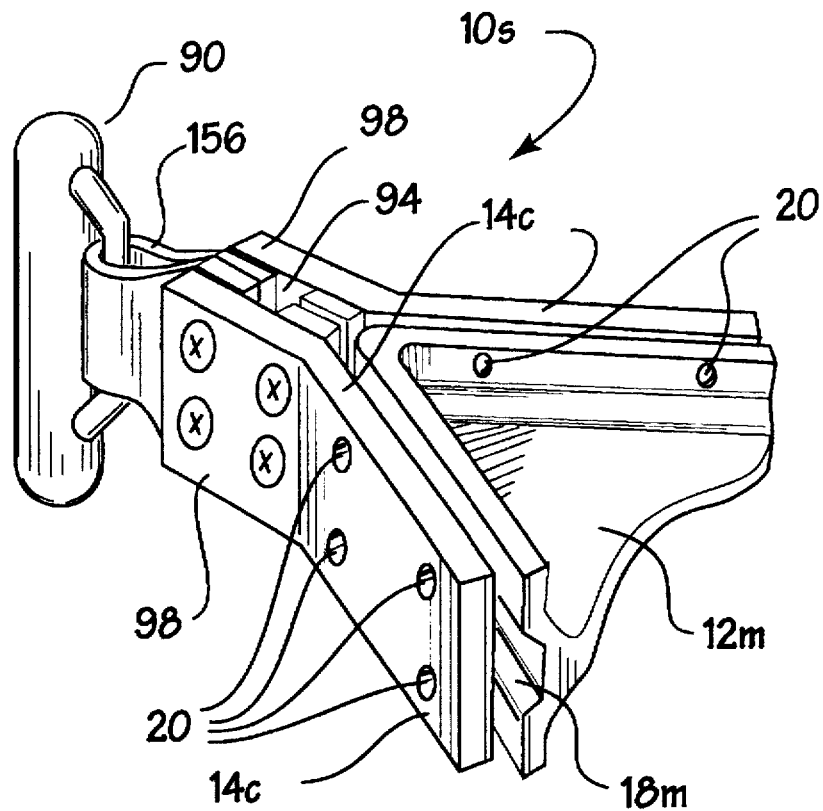
FIG. 22 shows an embodiment of the inducer adapted for use with a sail slide or slug slide.

Referring to FIG. 22, an inducer 10s is shown. Inducer 10s is similar to inducer 10c in FIG. 21, but 10s has a slide connector 156 sandwiched between forward extending portions 98. Slide connector 156 provides a connection for the bail portion of a sail slide (not shown) or a sail slug 90.

Figure 23:
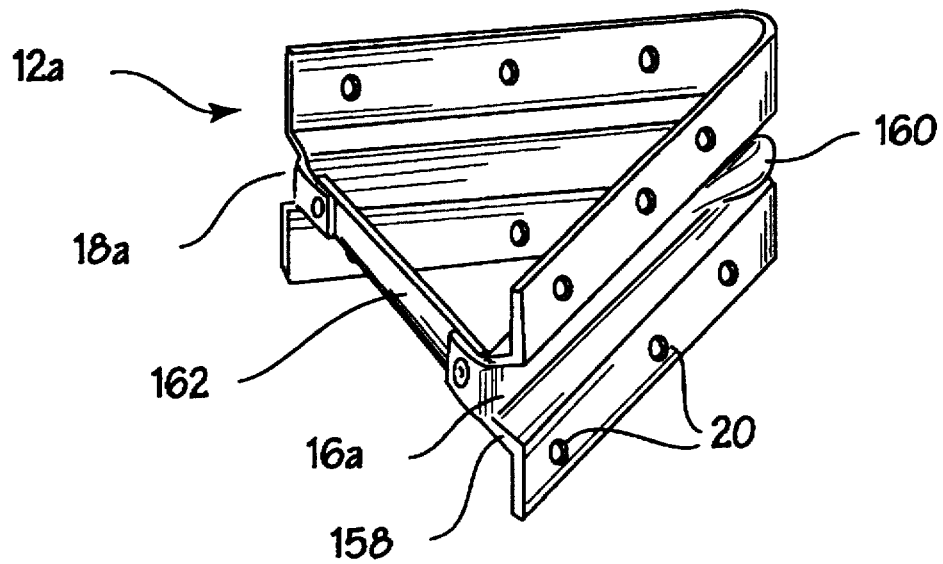
FIG. 23 shows an inducer body fabricated from an aluminum plate.

FIG. 23 shows inducer body 12a demonstrating an alternate method of fabricating inducer parts. Inducer body 12a is formed from a flat piece of aluminum. A channel 158 is formed in the plate which becomes receptacles 16a and 18a when body 12a is formed into a "V" shape. The deformation of the channel 158 closes the forward end of receptacles 16a and 18a and forms batten stop 160, which stops the forward movement of right and left battens 52 and 54. Brace 162 is attached to each end of channel 158 to provide the structure necessary to hold battens 52 and 54 at the desired angle.

Sail Shapes with a Rotatable Mast

Figure 24A:
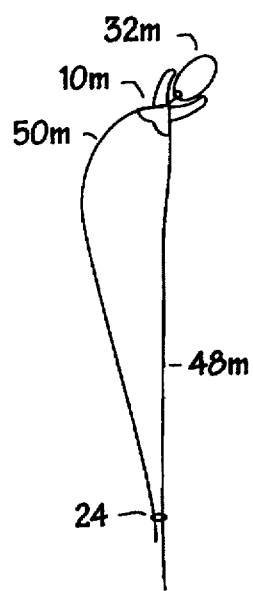
FIGS. 24A to 24C show sail shapes attainable with a rotating mast and my inducer.
Figure 24B:
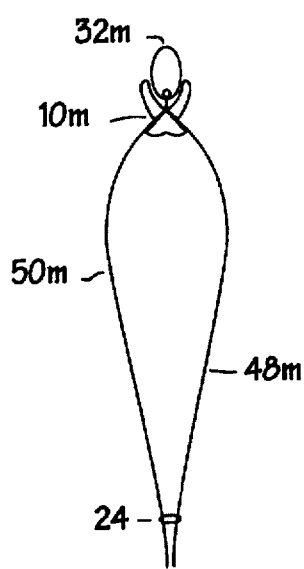
Figure 24C:
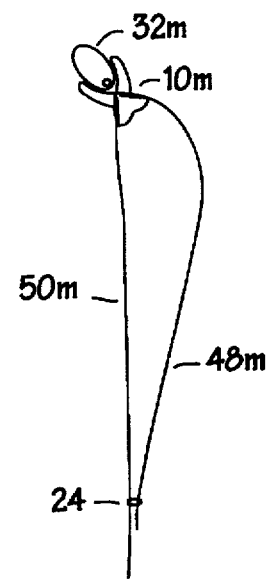

FIGS. 24A to 24C, demonstrate the sail shapes attainable with inducer 10m when used on a sailboat with a rotatable mast. The view is a top view showing the sail profiles. FIG. 24B show a neutral airfoil when the mast is not rotated in relation to the boom. 24A shows the sail profile resulting from when the mast is rotated in a clockwise direction in relation to the boom as would be the case for a starboard tack. FIG. 24C shows the mast rotated counter clockwise in relation to the boom, shaping the sail for a port tack.

Sail Shapes with a Non Rotatable Mast

Figure 25:
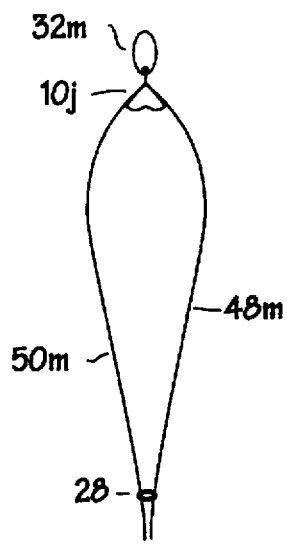
FIGS. 25A to 25C show sail shapes attainable with a non-rotating mast and my inducer.
Figure 25:
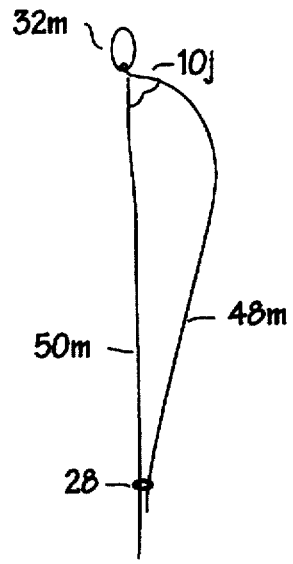
Figure 25:
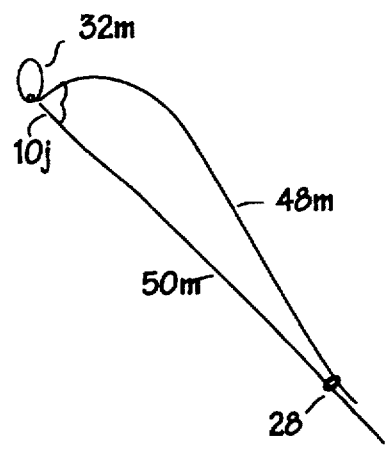

FIGS. 25A to 25C show sail shapes attainable with inducer 10j and a non-rotatable mast. The view is once again a top view showing the sail profiles. FIG. 25A shows a neutral airfoil. This shape would result with the boat headed directly into the wind (or with no wind at all).

FIG. 25B shows the sail shape if the boat is placed on a port tack. The wind is coming from the left, causing a positive wind pressure on left sail 50m and making it flatten out. As a result of this flattening, left batten 54 in left sail 50m presses on inducer 10j, causing inducer 10j to press outward on right batten 52 and right sail 48m. In addition, the wing shape and angle of attack cause a negative pressure on right sail 48m, which also helps to pull right sail 48m out, forming the arching camber shape of a wing. The batten characteristics are important because the more flexible portion 24 (FIG. 4A) is where the batten will bend to create the camber in the airfoil.

FIG. 25C is an example of the sail shape resulting from the main sheet line 80 being traveled out and with the wind coming from the lower left as would be the case on a port reach. The sail is rotated in relation to the non-rotatable mast 32m and also in relation to the boat (not shown), but still forming an efficient wing shape.

In view of the forgoing, it will be appreciated that the invention provides a batten retaining and positioning device which positions battens to form the sail into a double surfaced airfoil shape and the invention provides a camber inducer which can be adapted for this use on a windsurf sail or on a sailboat sail. The present invention also provides a method to assist in holding a mast rotation to assist the inducers in maintaining the desired wing sail shape. The present invention also provides a wing sail which is adaptable to both large and small craft and which can be mounted on a standard sail boat or sail board mast. The present invention further provides a wing sail with a reversible camber, providing an efficient wing shape on either tack and which allows the use of conventional mast rigging and methods of achieving mast support and rigidity. Still further, the present invention provides a wing sail which can be raised, lowered, and stowed with relative ease like a standard fully battened sail, with fewer parts making it simple, reliable, and inexpensive. The present invention further provides a wing sail which allows the use of conventional sail trimming techniques for adjusting the sail shape to various wind conditions and craft needs. Even further, the invention provides a clew connection which allows the two sail portions to shift while at the same time maintaining the desired sheeting forces and provides a mast rotation device to assist in shaping a wing sail.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A batten retaining device for a wing sail, the wing sail having a first sail surface and a second sail surface; the batten retaining device comprising:

(a) a first means for receiving a first elongated batten;

(b) a second means for receiving a second elongated batten;

(c) a body means for providing coupling structure from said first means for receiving to said second means for receiving, said body means positioned substantially between said first and second means for receiving, the body means being fabricated from relatively rigid material having sufficient strength to resist collapse or deformation caused by the sail pressing on said first and second elongated battens;

(d) said first means for receiving positioned on said body means at a predetermined angle in relation to said second means for receiving, whereby battens placed in each of the first and second means for receiving diverge from each other at said predetermined angle to hold the first surface of the wing sail substantially apart from the second surface of the wing sail; and (e) a pair of arms, each arm having a proximal end and a distal end, the proximal end being connected to the body and the distal end terminating adjacent to a mast whereby said pair of arms provide a means for transferring rotational movement of said mast to the arms to impart a rotational movement to said body, and whereby said body rotates substantially in synchronization with said mast.

2. The batten retaining device of claim 1 wherein said pair of arms comprise a first arm and a second arm and wherein said first arm is attached to a first plate and wherein said second arm is attached to a second plate.

3. The batten retaining device of claim 1 further including:

(a) means for engaging said first sail surface to said batten retaining device adjacent to said first means for receiving; and (b) means for engaging said second sail surface to said batten retaining device adjacent to said second means for receiving.

4. The batten retaining device of claim 3 wherein said means for engaging said first sail surface to said batten retaining device comprises a first plate whereby a portion of said first sail surface can be clamped between said batten retaining device and said first plate; and said means for engaging said second sail surface to said batten retaining device comprises a second plate whereby a portion of said second sail surface can be clamped between said body and said second plate.

5. The batten retaining device of claim 1 wherein said first means for receiving comprises:

(a) a first recess formed on the exterior of said body means; and (b) a first plate secured to said body means over said first recess;

and wherein said second means for receiving comprises:

(c) a second recess formed on the exterior of said body means; and (d) a second plate secured to said body means over said second recess.

6. The batten retaining device of claim 1 wherein said body means has a shape substantially similar to the letter v, and when placed in position for use on the sail, said body means is positioned so the apex or bottom point of the v shape points generally forward toward the luff of the sail.

7. The batten retaining device of claim 1 further comprising installation on a craft including a mast or similar support structure; a boom or similar support structure, the boom having a first end and a second end; the boom pivotally attached to said mast at said first end; and a clew connection means of connecting the first and second sail surfaces to said boom at said second end, wherein the clew connection means comprises:

(a) a block means, the block means pivotally connected to said boom;

(b) a first clew plate connection means connected to said first sail surface, and a second clew plate connection means connected to said second sail surface;

(c) a flexible connection means connecting said first clew connection means to said block and the flexible connection means continuing through said block and connecting said block to said second clew plate connection means; and (d) the block means and clew plate connection means in combination providing a tension means whereby relative movement of the first and second sail surface may take place while said tension means also applies appropriate tension from said boom to said first and second sail surface, whereby mainsheet tension can be transferred from said boom to said first and second sail surfaces without interfering with the relative fore and aft or vertical movement of said first and second sail surfaces.

8. The batten retaining device of claim 7 wherein the block means comprises:

(a) multiple sheaves aligned horizontally and spaced apart whereby a line passing from above, around the sheaves, and back above the block are separated substantially more than the diameter of the individual sheaves;

(b) said sheaves being sandwiched between two rigid plates; and (c) the block having a swiveling connector, the swiveling connector allowing rotational movement about an axis perpendicular to said boom, the swiveling connector having a means for connection to said boom second end whereby said block is allowed to pivot about said means for connection.

9. A boom to mast connection for rotatably connecting a mast to a boom, the boom being attached at approximately a right angle to said mast, the mast having a longitudinal axis, the mast being able to rotate about said longitudinal axis while fully rigged for use in sailing, said connection comprising:

(a) a body structure;

(b) a means for attaching to a boom, the means for attaching positioned on said body structure;

(c) a means for attaching to a mast, said means connected to said body structure wherein the means for attaching to a mast includes a secure coupling means, whereby said mast is held without allowing slippage between said mast and said coupling means; and (d) a means for mast rotation, whereby said mast is able to rotate about the axis of said mast in relation to said boom while maintaining substantially a right angle with said boom, wherein the means for mast rotation comprises an arm connected to said secure coupling means for applying rotational force to said mast, said arm being able to assume a first rotational position or a second rotational position, and said arm being able to pivot between said first and second rotational position, whereby a mechanical advantage is used to impart a rotational force to said mast.

10. The boom to mast connection of claim 9 further including a means for applying a rebounding force to said arm whereby the rebounding force tends to maintain said arm in one of said first or second rotational positions.

11. The boom to mast connection of claim 10 wherein said means for applying a rebounding force comprises a spring.

* * * * *